(12) United States Patent
Watanuki et al.

(10) Patent No.: US 7,471,355 B2
(45) Date of Patent: Dec. 30, 2008

(54) LIQUID CRYSTAL DISPLAY, SURFACE LIGHT SOURCE DEVICE, AND INFORMATION DEVICE

(75) Inventors: Ken Watanuki, Kyoto (JP); Gouo Kurata, Nara (JP); Kenji Sakurai, Kyoto (JP); Akihiro Funamoto, Nara (JP); Shigeru Aoyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 334 days.

(21) Appl. No.: 11/502,747

(22) Filed: Aug. 11, 2006

(65) Prior Publication Data

US 2007/0035680 A1     Feb. 15, 2007

(30) Foreign Application Priority Data

Aug. 11, 2005     (JP)  ............................. 2005-233017

(51) Int. Cl.
*G02F 1/1335*     (2006.01)
(52) U.S. Cl. .............................. 349/65; 349/62; 349/64; 385/901
(58) Field of Classification Search ............. 349/61–65; 385/901
See application file for complete search history.

(56) References Cited

U.S. PATENT DOCUMENTS

| 6,530,671 | B2 * | 3/2003 | Taniguchi et al. ........... 362/619 |
| 6,612,722 | B2 * | 9/2003 | Ryu et al. .................... 362/331 |
| 6,671,013 | B1 * | 12/2003 | Ohkawa ....................... 349/62 |
| 6,700,632 | B2 * | 3/2004 | Taniguchi et al. ............. 349/65 |
| 6,704,070 | B2 * | 3/2004 | Taniguchi et al. ............. 349/65 |
| 6,727,963 | B1 * | 4/2004 | Taniguchi et al. ............. 349/65 |
| 6,803,977 | B2 * | 10/2004 | Taniguchi et al. ............. 349/65 |
| 2002/0041349 | A1 * | 4/2002 | Ohkawa ....................... 349/65 |
| 2003/0058385 | A1 | 3/2003 | McKnight et al. |

FOREIGN PATENT DOCUMENTS

| JP | 11-352312 A | 12/1999 |
| JP | 2002-107706 A | 4/2002 |

* cited by examiner

*Primary Examiner*—Michelle R Connelly Cushwa
*Assistant Examiner*—Rhonda S Peace
(74) *Attorney, Agent, or Firm*—Osha • Liang LLP

(57) ABSTRACT

A liquid crystal display has a light guide plate having a light-emitting plane on its one end surface, a light source arranged on a side surface of the light guide plate, and a liquid crystal panel arranged opposite the light-emitting plane of the light guide plate. Deflection patterns are formed on a surface opposite the light-emitting plane of the light guide plate, and the deflection patterns are arranged so that two independent components on the surface opposite the light-emitting plane of the light guide plate are random. In a certain region on the surface opposite the light-emitting plane, when an average value of the number of the deflection patterns included in each region opposite each pixel of the liquid crystal panel is designated by μn and a standard deviation is designated by σn, their ratio satisfies the relationship: $0<\sigma n/\mu n \leq 0.154$. Light from the light source introduced into the light guide plate is deflected towards the light-emitting plane by the deflection patterns so as to be emitted from the light-emitting plane. The liquid crystal panel is illuminated by the light emitted from the light-emitting plane.

9 Claims, 28 Drawing Sheets

~1cm

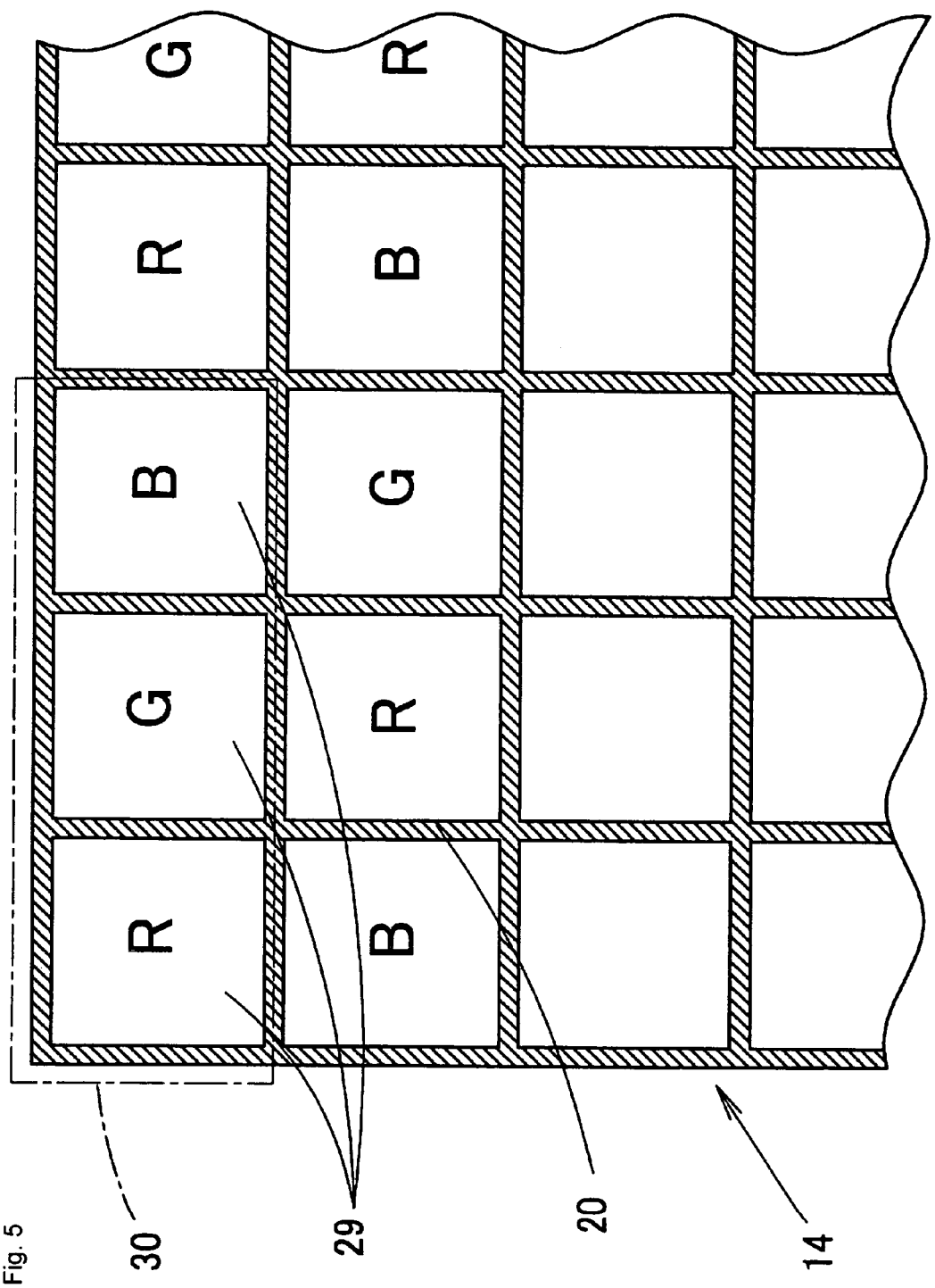

POSITION x

POSITION x

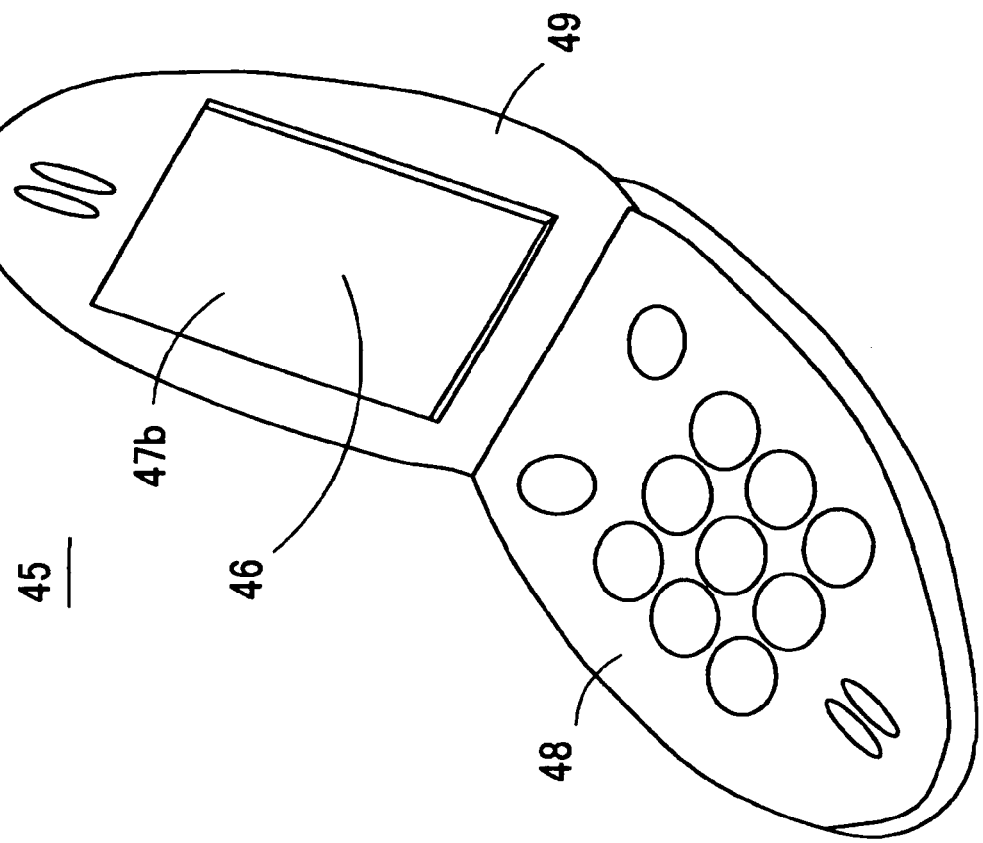
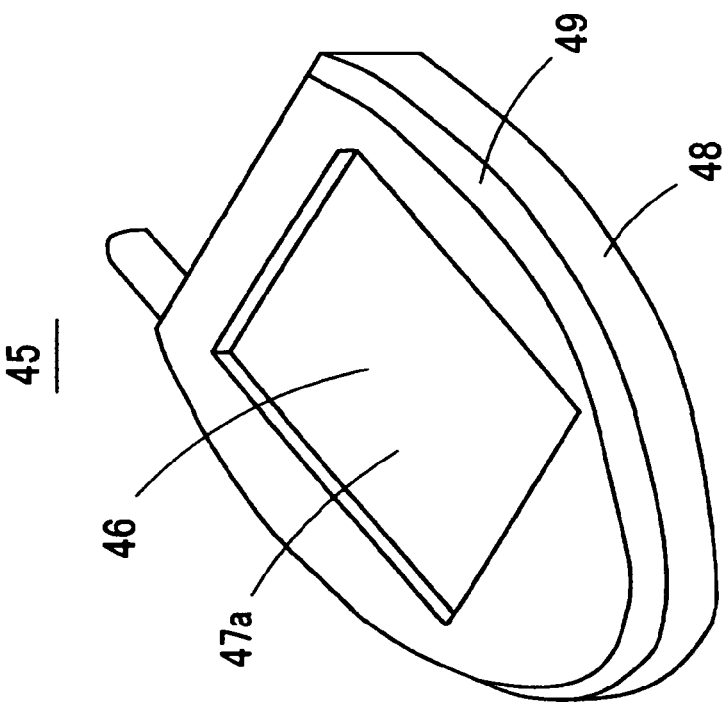
Fig. 27A
Fig. 27B

LIQUID CRYSTAL DISPLAY, SURFACE LIGHT SOURCE DEVICE, AND INFORMATION DEVICE

BACKGROUND OF THE RELATED ART

1. Field of the Invention

The present invention relates to a liquid crystal display in which glare on a display screen is reduced, and a surface light source device.

2. Description of the Related Art

In liquid crystal displays, when the display screens produce glare, image quality is deteriorated, and thus it is desired that the glare on the screens is reduced. Techniques for suppressing the glare on the screens in the liquid crystal displays have been proposed for example, in Japanese Patent Application Laid-Open Nos. 2002-107706 and 11-352312 (1999).

In a liquid crystal display described in Japanese Patent Application Laid-Open No. 2002-107706, the following method is proposed. According to this method, a diffusion layer and a glare-proof layer, provided on a front surface of a liquid crystal panel, diffuses light emitted from the liquid crystal panel, and the total haze value is set to 30 to 80%, so that the glare on the screen is made to be unnoticeable.

In the liquid crystal display described in Japanese Patent Application Laid-Open No. 2002-107706, however, since the light emitted from the liquid crystal panel is diffused, definition of an image is deteriorated and front surface luminance (in this specification, the forward direction of the liquid crystal display is occasionally called the front surface) is deteriorated.

In a liquid crystal display described in Japanese Patent Application Laid-Open No. 11-352312 (1999), a rough plane is formed on a light-emitting plane of a light guide plate, and the light emitted from the light-emitting plane is diffused on the rough plane so that the glare on a screen is made to be unnoticeable. Thereafter, a prism sheet deflects scattering light in a direction approximately vertical to the light-emitting plane.

In the liquid crystal display described in Japanese Patent Application Laid-Open No. 11-352312 (1999), since the scattering light is aligned to the direction vertical to the light-emitting plane by the prism sheet, a decrease in the front surface luminance of the liquid crystal display can be suppressed. Due to the rough plane formed on the light-emitting plane, however, the definition of an image is deteriorated, and the decrease in the front surface luminance caused by the rough plane cannot be completely recovered by the prism sheet. In the liquid crystal display described in Japanese Patent Application Laid-Open No. 11-352312 (1999), since the prism sheet is expensive, this prevents price-reduction of the liquid crystal display.

In the above related art, the glare on the screens is reduced only according to response measures, and the cause of the glare is not clarified and thus the there is still glare on the screen.

SUMMARY

In one or more embodiments of the invention, a liquid crystal display where luminance variation in a minute region of a screen is suppressed so that glare on the screen is reduced, and a surface light source device is provided.

A liquid crystal display according to one or more embodiments of the present invention includes: a light guide plate having a light-emitting plane on one end surface; a light source arranged on a side surface of the light guide plate; and a liquid crystal panel arranged, opposite the light-emitting plane of the light guide plate. Deflection patterns are formed on a surface opposite the light-emitting plane of the light guide plate, and the defection patterns are arranged so that two independent components on the surface opposite the light-emitting plane of the light guide plate become random. In a certain region on the surface opposite the light-emitting plane, when an average number of the deflection patterns included in each region opposite each pixel of the liquid crystal panel is designated by $\mu n$ and a standard deviation is designated by $\sigma n$, their ratio satisfies the following relationship:

$$0 < \sigma n / \mu n \leq 0.154.$$

Light from the light source introduced into the light guide plate is deflected towards the light-emitting plane by the deflection patterns and is emitted from the light-emitting plane, and light emitted from the light-emitting plane illuminates the liquid crystal panel.

A liquid crystal display according to one or more embodiments of the present invention includes: a light guide plate having a light-emitting plane on one end surface; a light source arranged on a side surface of the light guide plate; and a liquid crystal panel arranged opposite to the light-emitting plane of the light guide plate. Deflection patterns are formed on a surface opposite the light-emitting plane of the light guide plate, and the deflection patterns are arranged so that two independent components on the surface opposite the light-emitting plane are random. In a certain square region having a side with length of K on the surface opposite the light-emitting plane, when the number of the deflection patterns included in the corresponding square region is designated by M, a ratio of a pixel pitch p of the liquid crystal panel to an average pattern gap defined by:

$$Samp\_A = K/(\sqrt{M})$$

satisfies the following relationship:

$$Samp\_A/p \leq 0.28.$$

Light from the light source introduced into the light guide plate is deflected towards the light-emitting plane by the deflection patterns and is emitted from the light-emitting plane, and the liquid crystal panel is illuminated by the light emitted from the light-emitting plane of the light guide plate.

A liquid crystal display according to one or more embodiments of the present invention includes: a light guide plate having a light-emitting plane on one end surface; a point light source arranged on a side surface of the light guide plate; and a liquid crystal panel arranged opposite the light-emitting plane. Deflection patterns are formed on a surface opposite the light-emitting plane of the light guide plate, and the deflection patterns are arranged so that two independent components on the surface opposite the light-emitting plane are random. In the case where a projection area of the deflection patterns to the light-emitting plane is designated by S, a distance between the light source and the deflection pattern is designated by Rp and a thickness of the light guide plate in positions of the deflection patterns is designate by d, in a certain region on the surface opposite the light-emitting plane, when an average value obtained by adding $S/(Rp \times d)$ of all the deflection patterns included in all the regions opposite the pixels of the liquid crystal panel is designated by $\mu\alpha$ and a standard deviation is designated by $\sigma\alpha$, their ratio satisfies the following relationship:

$$0 < \sigma\alpha/\mu\alpha \leq 0.154.$$

Light from the light source introduced into the light guide plate is deflected towards the light-emitting plane by the deflection patterns and is emitted from the light-emitting plane, and the liquid crystal panel is illuminated by the light emitted from the light-emitting plane of the light guide plate.

A surface light source device according to one or more embodiments of the present invention includes: a light guide plate having a light-emitting plane on one end surface; and a light source arranged on a side surface of the light guide plate. Deflection patterns are formed on a surface opposite the light-emitting plane of the light guide plate, and the deflection patterns are arranged so that two independent components on the surface opposite the light-emitting plane become random. In a certain region on the surface opposite the light-emitting plane, when an average number of the deflection patterns included in each pixel corresponding region is designated by $\mu n$ and a standard deviation is designated by $\sigma n$, their ratio satisfies the following relationship:

$$0 < \sigma n/\mu n \leq 0.154.$$

Light from the light source introduced into the light guide plate is deflected towards the light-emitting plane by the deflection patterns and is emitted from the light-emitting plane.

A surface light source device according to one or more embodiments of the present invention includes: a light guide plate having a light-emitting plane on one end surface; and a light source arranged on a side surface of the light guide plate. Deflection patterns are formed on a surface opposite the light-emitting plane of the light guide plate, the deflection patterns are arranged so that two independent components on the surface opposite the light-emitting plane are random. In a certain square region having a side with length of K on the surface opposite the light-emitting plane, when the number of the deflection patterns included in the corresponding square region is designated by M, a ratio of a pixel pitch p of a pixel corresponding region to an average pattern gap defined by:

$$\text{Samp\_}A = K/(\sqrt{M})$$

satisfies the following relationship:

$$\text{Samp\_}A/p \leq 0.28.$$

Light from the light source introduced into the light guide plate is deflected towards the light-emitting plane by the deflection patterns and is emitted from the light-emitting plane.

A surface light source device according to one or more embodiments of the present invention includes: a light guide plate having a light-emitting plane on one end surface; and a point light source arranged on a side surface of the light guide plate. Deflection patterns are formed on a surface opposite the light-emitting plane of the light guide plate, the deflection patterns are arranged so that two independent components on the surface opposite the light-emitting plane are random. In the case where a projection area of the deflection patterns to the light-emitting plane is designated by S, a distance between the light source and the deflection pattern is designated by Rp and a thickness of the light guide plate in positions of the deflection patterns is designate by d, in a certain region on the surface opposite the light-emitting plane, when an average value obtained by adding $S/(Rp \times d)$ of all the deflection patterns included in all the pixel corresponding regions of the liquid crystal panel is designated by $\mu \alpha$ and a standard deviation is designated by $\sigma \alpha$, their ratio satisfies the following relationship:

$$0 < \sigma \alpha/\mu \alpha \leq 0.154.$$

Light from the light source introduced into the light guide plate is deflected towards the light-emitting plane by the deflection patterns and is emitted from the light-emitting plane.

The above-explained components can be combined arbitrarily as possible.

BRIEF DESCRIPTION OF THE DRAWINGS

FIG. 5 shows a pattern diagram viewed from a front surface of a liquid crystal panel;

FIGS. 27A and 27B show perspective views illustrating a folding type cellular telephone into which a liquid crystal display according to one embodiment of the present invention is incorporated.

DETAILED DESCRIPTION

Embodiments of the present invention are explained in detail below with reference to the drawings. One skilled in the art will appreciate that the present invention is not limited to the specific embodiments explained below.

Figure 1:
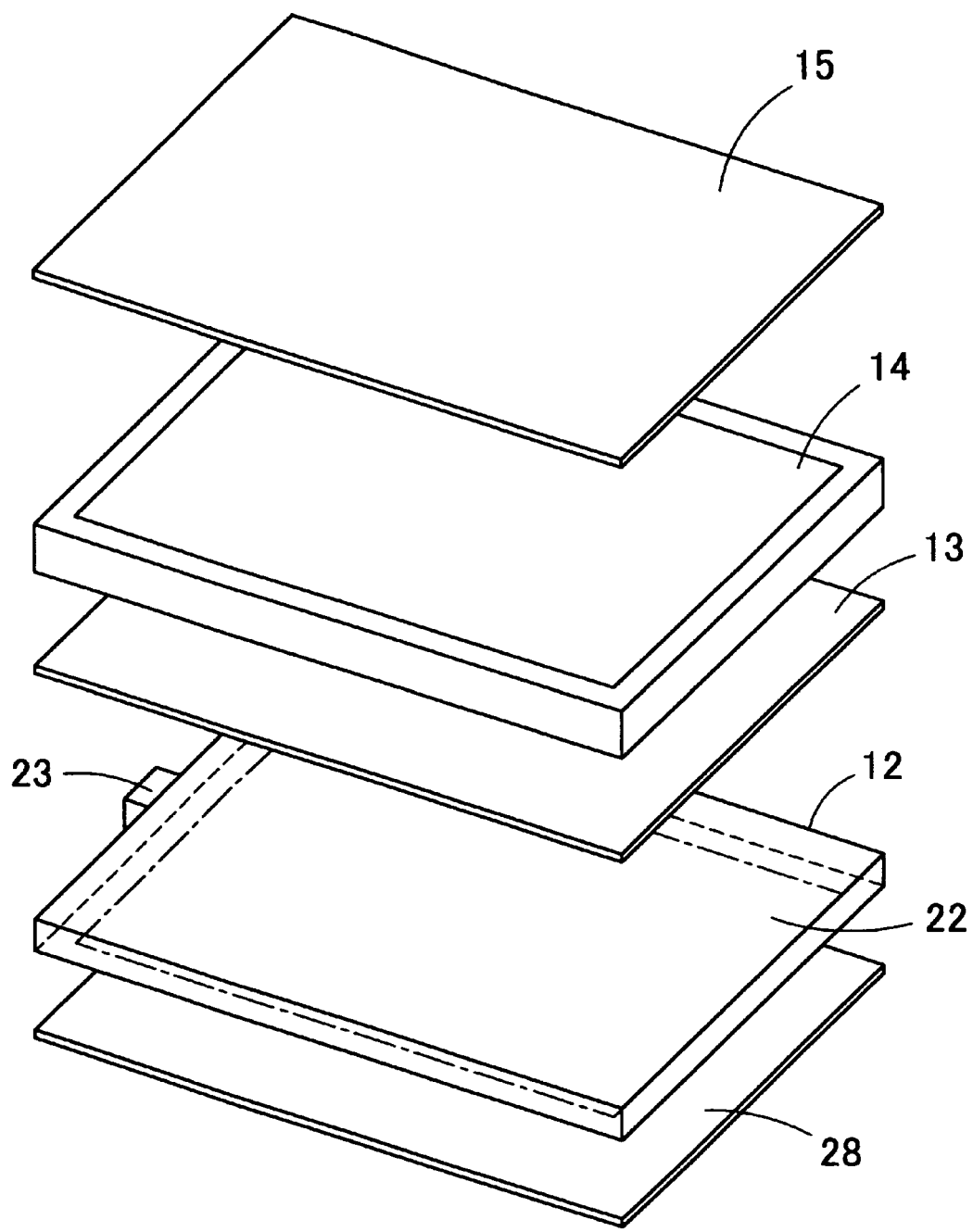
FIG. 1 shows an exploded perspective view of a liquid crystal display according to a first embodiment of the present invention.
Figure 2:
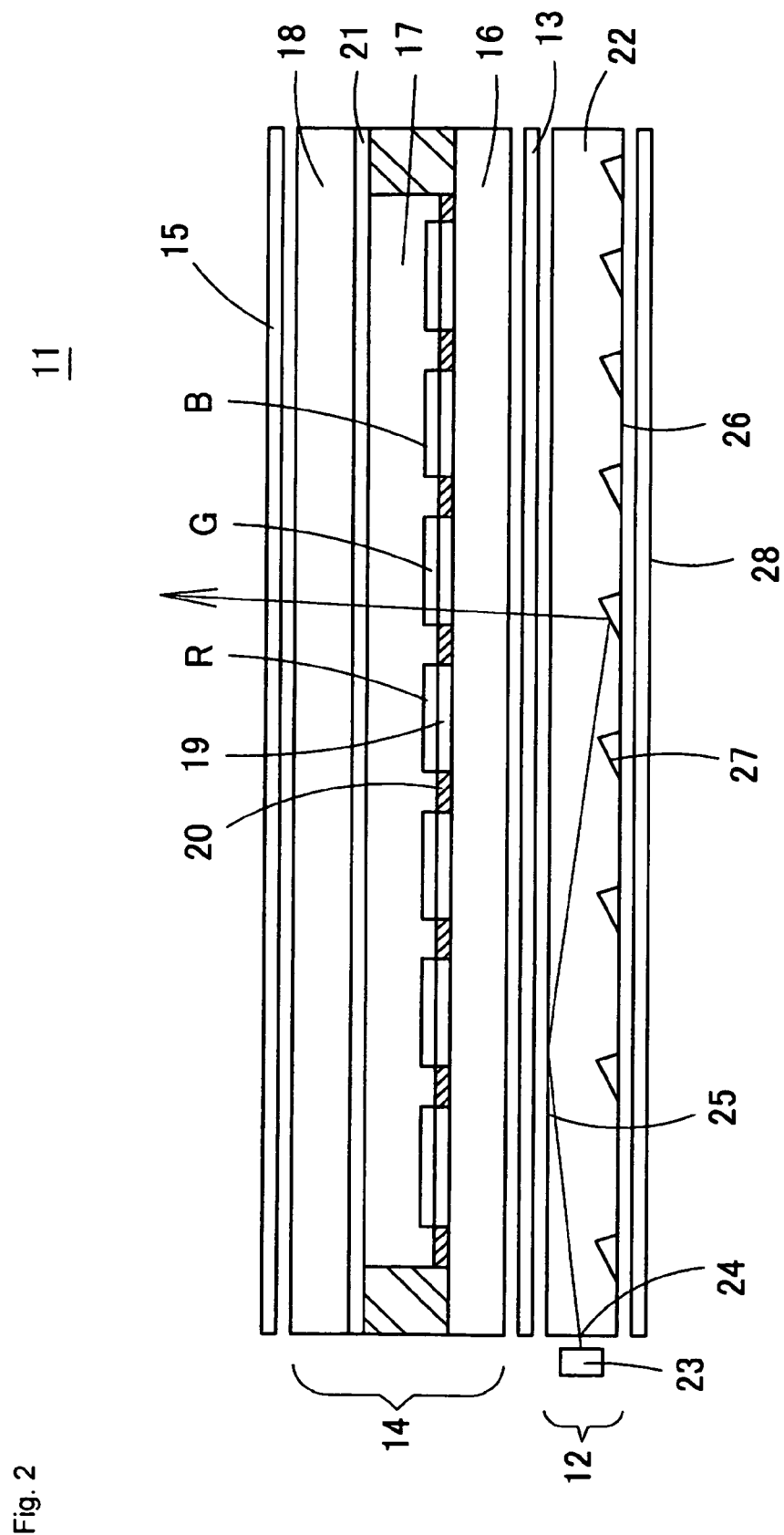
FIG. 2 shows a schematic sectional view of a liquid crystal display.

FIG. 1 shows an exploded perspective view of a liquid crystal display 11 according to a first embodiment of the present invention. FIG. 2 shows a schematic sectional view of the liquid crystal display 11. The liquid crystal display 11 is constituted by a surface light source device 12, a liquid crystal panel 14, two polarizing plates 13 and 15, and a light reflecting plate 28. The light reflecting plate 28, the surface light source device 12, the polarizing plate 13, the liquid crystal panel 14 and the polarizing plate 15 are overlapped in this order from a rear face side.

The liquid crystal panel 14 is not particularly limited, and may have any structure and system. For example, a color liquid crystal panel to be used generally is constituted so that liquid crystal 17 is sealed between two glass substrates 16 and 18 as shown in FIG. 2. Transparent pixel electrodes 19 are formed on an inner surface of the glass substrate 16 on the rear face side, and a red filter R, a green filter G or a blue filter B is formed thereon. TFTs and wirings are provided between the pixel electrodes 19 and the filters R, G and B, and TFT and the wiring are covered with black matrix 20 made of light shielding material (for example, black coating material). A transparent overall surface electrode 21 is formed on an approximately entire inner surface of a glass substrate 18 on the front surface side. Respective pixels are formed on the liquid crystal panel 14 opposite the pixel electrodes 19 and the filters R, G and B surrounded by the black matrices 20.

The polarizing plates 13 and 15 on both the sides of the liquid crystal panel 14 are arranged with them being turned 90° so that their deflection directions are perpendicular to each other.

White light emitted from the surface light source device 12 to a front side transmits through the polarizing plate 13 and is converted into linear polarized light. The linear polarized light, which transmits through the polarizing plate 13, transmits through the red filter R, the green filter G, and the blue filter B in the corresponding pixels, and is thereby converted into red light, green light and blue light, respectively. When a voltage is applied to the pixel electrode 19 in a certain pixel, the red, green or blue linear polarized light, which transmits through the polarizing plate 13 and the filter R, G or B is turned 90° on a deflection plane by the liquid crystal 17 and transmits through the polarizing plate 15. The light is, therefore, emitted from the pixel to the front side.

In the pixel where the voltage is not applied to the pixel electrode 19, the red, green or blue linear polarized light, which transmits through the polarizing plate 13 and the filter R, G or B, is not turned on the deflection plane by the liquid crystal 17 and passes through the liquid crystal 17. For this reason, the deflection plane of the linear polarized light entering the polarizing plate 15 is perpendicular to the polarizing direction of the polarizing plate 15, and the linear polarized light cannot transmit through the polarizing plate 15. The light is not, therefore, emitted from the pixel to the front side.

According to the above principle, the voltages to be applied to the pixel electrodes 19 in all the pixels are controlled, so that a color image can be generated by the liquid crystal display 11.

The surface light source device 12 (back light) is constituted by a light guide plate 22 and a light source 23, and the light source 23 is arranged opposite a light incident plane 24 of the light guide plate 22. The light source 23, though not shown, is constituted so that one or several LEDs are sealed into transparent mold resin and a surface of the mold resin other than a light-emitting window is covered with white resin. After the light emitted from LED is reflected directly or from an interface between the mold resin and the white resin, it is emitted from the light-emitting window on the front face of the light source 23. The light source 23 is opposite the light incident plane 24 where the light-emitting window is provided to the end surface of the light guide plate 22. The light source 23 may be a point light source, sufficiently smaller than a side length of the light guide plate 22, or may be a linear light source where LEDs are arranged one-dimensionally opposite the light incident plane 24 of the light guide plate 22. The first embodiment provides an example of a display using a point light source.

The light guide plate 22 is formed into a plate shape by transparent resin with high refractive index such as polycarbonate resin, methacrylic resin or COP (cycloolefin polymer). The front face of the light guide plate 22 is a light-emitting plane 25, and a lot of deflection patterns 27 are dented on a pattern surface 26 that is opposite light-emitting plane 25. The light reflecting plate 28 is formed by a white resin film or a metal film, and is arranged opposite the pattern surface 26 of the light guide plate 22.

Figure 3:
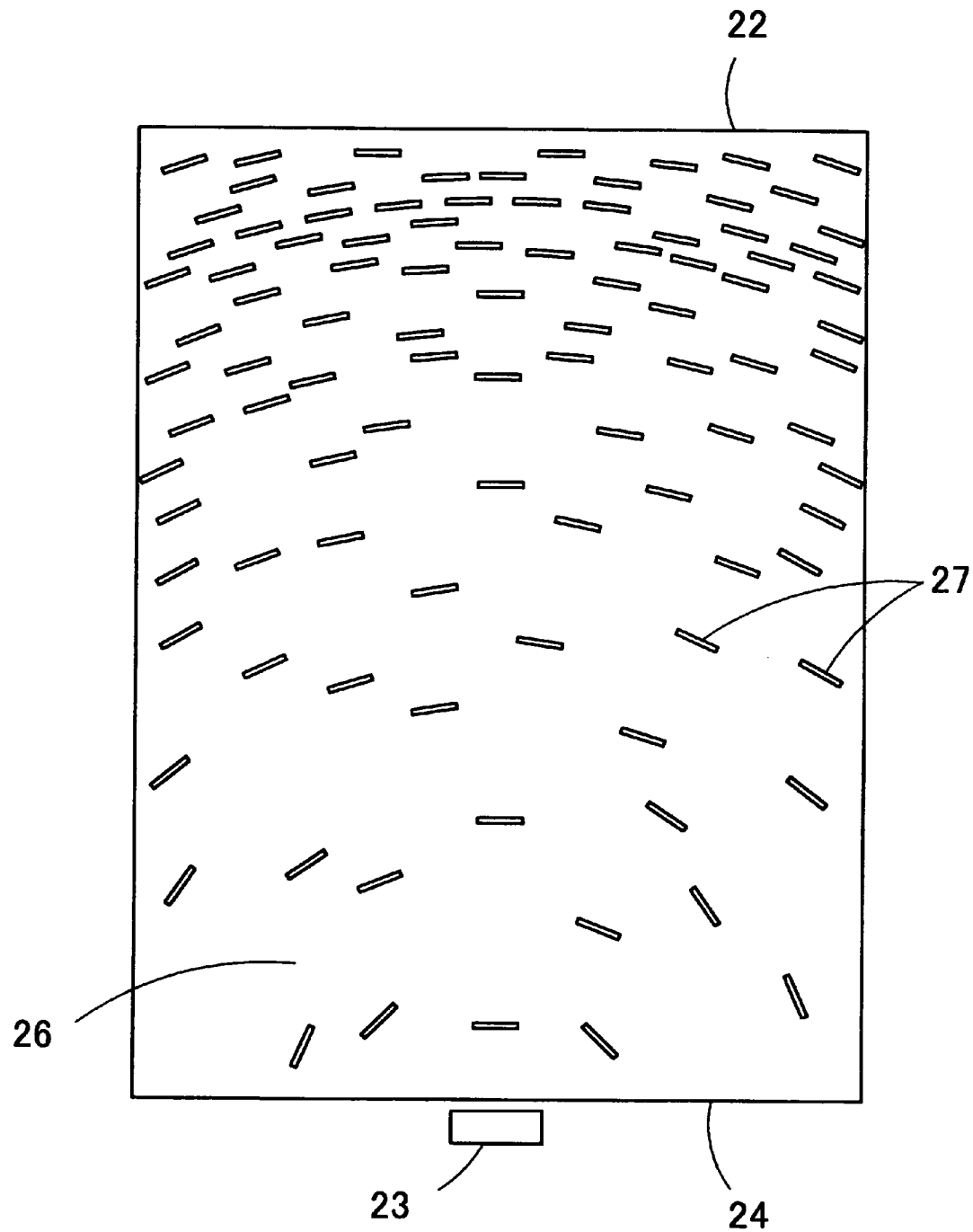
FIG. 3 shows a pattern diagram for explaining a deflection pattern arrangement formed on a pattern surface of a light guide plate.

FIG. 3 is a pattern diagram for explaining an arrangement of the deflection patterns 27 formed on the pattern surface 26 of the light guide plate 22. The deflection patterns 27 are used for totally reflecting the light entering the light incident plane 24 of the light guide plate 22 and allowing the light to emit from the light-emitting plane 25 approximately vertically. The deflection patterns 27 are optical patterns formed by denting the pattern surface 26 into a triangular prism shape, and are arranged discretely on a concentric circle about the light source 23. Like a light beam shown by an arrow of FIG. 2, the light emitted from the light source 23 enters the light incident plane 24 of the light guide plate 22, and is totally reflected and repeatedly between the light-emitting plane 25 and the pattern surface 26 and thus guided into the light guide plate 22. The light which enters the deflection patterns 27 is totally reflected towards a direction approximately vertical to the light-emitting plane 25 by the deflection patterns 27, and are emitted from the light-emitting plane 25 to the outside. The light emitted from the light-emitting plane 25 illuminates the rear surface of the liquid crystal panel 14, so that a latent image on the liquid crystal panel 14 can be recognized. As to the deflection patterns 27, the pattern density (numerical density of the deflection patterns 27 or area density of the reflection surface of the deflection patterns 27) is comparatively small in the vicinity of the light source 23, and the pattern density becomes larger in positions farther away from the light source 23. As a result, luminance distribution of the light emitted from the light-emitting plane 25 is made to be uniform.

Figure 4:
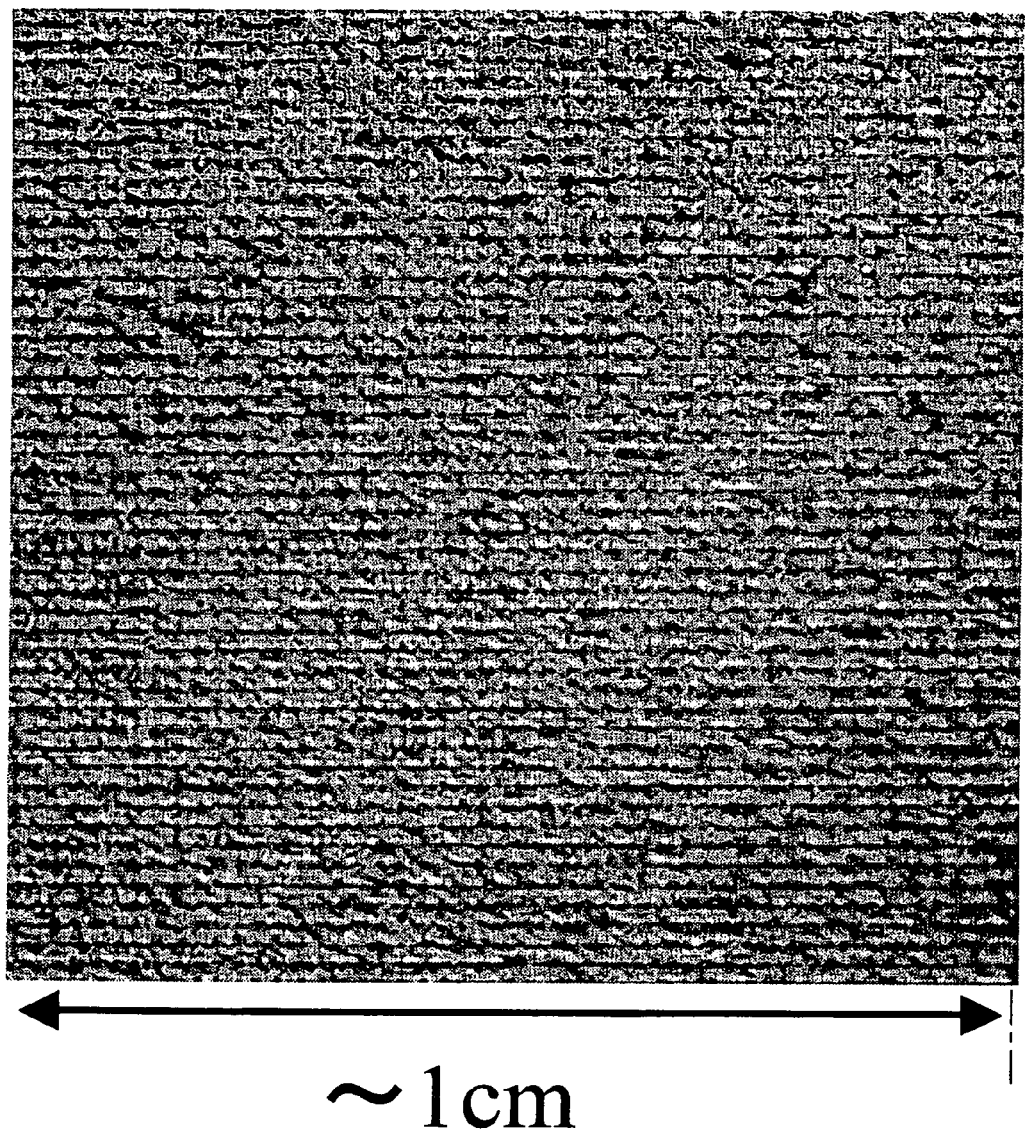
FIG. 4 shows a diagram illustrating an enlarged 1-cm square region on a screen of a liquid crystal display where scattering occurs.

FIGS. 4 to 6 show diagrams for explaining the glare on the screen, but for the sake of convenience, this explanation uses the same reference numerals as those in the first embodiment.

FIG. 4 shows a diagram where about 1-cm region on the screen in which scattering occurs is enlarged. The display screen of the color liquid crystal display is constituted by a lot of minute red, green, blue and black (nonradiative spot) light spots. According to FIG. 4, the glare on the screen occurs because the luminance of the light spots is not uniform but scatters. Since these light spots are light which transmits through the pixels of the liquid crystal panel 14 one by one, the cause for the glare on the screen is estimated to be the luminance scattering in each pixel of the liquid crystal display. The cause for the luminance scattering in each pixel is examined.

FIG. 5 shows a pattern diagram viewed from the front surface of the liquid crystal display panel 14. The liquid crystal panel 14 shown in FIG. 5 is divided by the black matrices 20, and the pixels 29 are formed in regions surrounded by the black matrices 20. In the case of the liquid crystal panel 14 for color display, three pixels including the pixel 29 having the red filter R, the pixel 29 having the green filter G and the pixel 29 having the blue filter B constitute one picture element 30 (in the case of the liquid crystal display for monochrome display, the respective pixels are independent). Since the respective pixels 29 are formed into a constant size regularly, the black matrices 20 are also formed regularly at constant pitch.

Since the pixels 29 of the liquid crystal panel 14 are arranged regularly at constant pitch, when the deflection patterns 27 of the light guide plate 22 are provided regularly in the minute regions, interference occurs between liquid crystal panel 14 and the light guide plate 22, thereby causing Moire fringes (Moire pattern) on the screen of the liquid crystal display. For this reason, the deflection patterns 27 of the light guide plate 22 are generally arranged randomly.

Figure 6A:
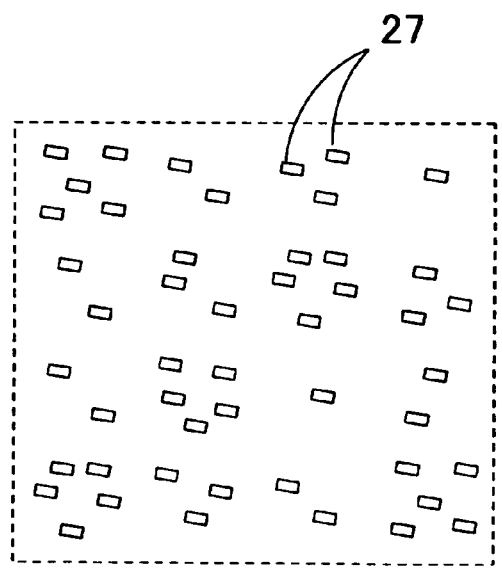
FIG. 6A shows a diagram illustrating deflection patterns arranged randomly.
Figure 6B:
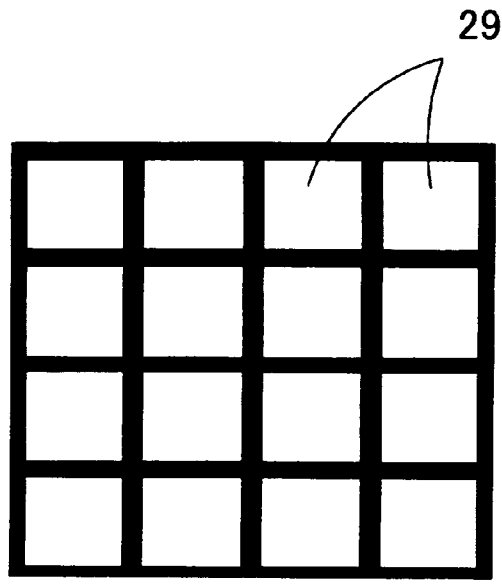
FIG. 6B shows a diagram illustrating pixels arranged regularly.
Figure 6C:
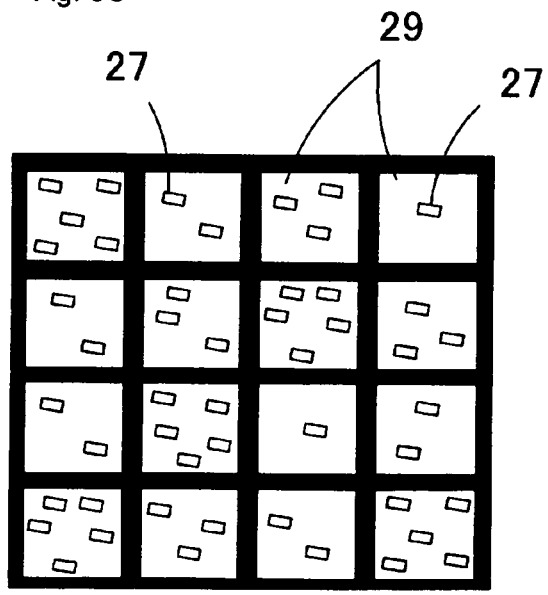
FIG. 6C shows a diagram illustrating a state that the deflection patterns and the pixels are overlapped.
Figure 6D:
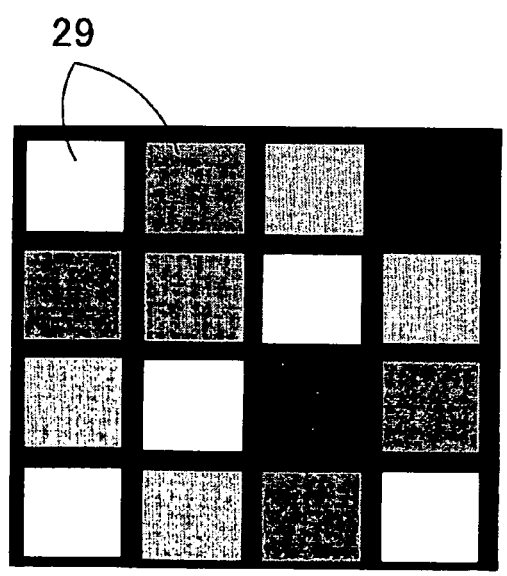
FIG. 6D shows a diagram illustrating luminance of pixels.

The case where the deflection patterns 27 arranged randomly as shown in FIG. 6A are overlapped with the pixels 29 arranged regularly as shown in FIG. 6B is considered, a state shown in FIG. 6C is obtained. Since the arrangement of the deflection patterns 27 is random, as shown in FIG. 6C, the number of the deflection patterns 27 included in the respective pixels 29 is irregular. The luminance of the respective pixels 29 is proportional to the quantity of the light reflected by the deflection patterns 27 in the pixels 29, namely, the number of the deflection patterns 27, the luminance of the pixels 29 scatters according to the number of the deflection patterns 27. When the pixels 29 are observed microscopically, the pixels 29 which include the larger number of the deflection patterns 27 are brighter, and the pixels 29 which include the smaller number of the deflection patterns 27 are darker as shown in FIG. 6D. It is, therefore, found that a state where FIG. 6D is observed macroscopically is the glare on the screen shown in FIG. 4.

One aspect of the invention relates to the method of arranging the deflection patterns without generating the Moire fringes while a person does not visually feel the glare. That is, in the liquid crystal display 11 of this embodiment of the present invention, when the average number of the deflection patterns 27 in the region corresponding to each pixel is designated by $\mu n$ and its standard deviation is designated by $\sigma n$, a ratio of the standard deviation $\sigma n$ to the average number $\mu n$ of the deflection patterns 27 in each pixel (hereinafter, the pattern arrangement scattering) satisfies the following relationship:

$$0 < \sigma n / \mu n \leq 0.154.$$

Further, the deflection patterns 27 are shifted in two directions so that generation of Moire fringes is prevented.

Figure 7:
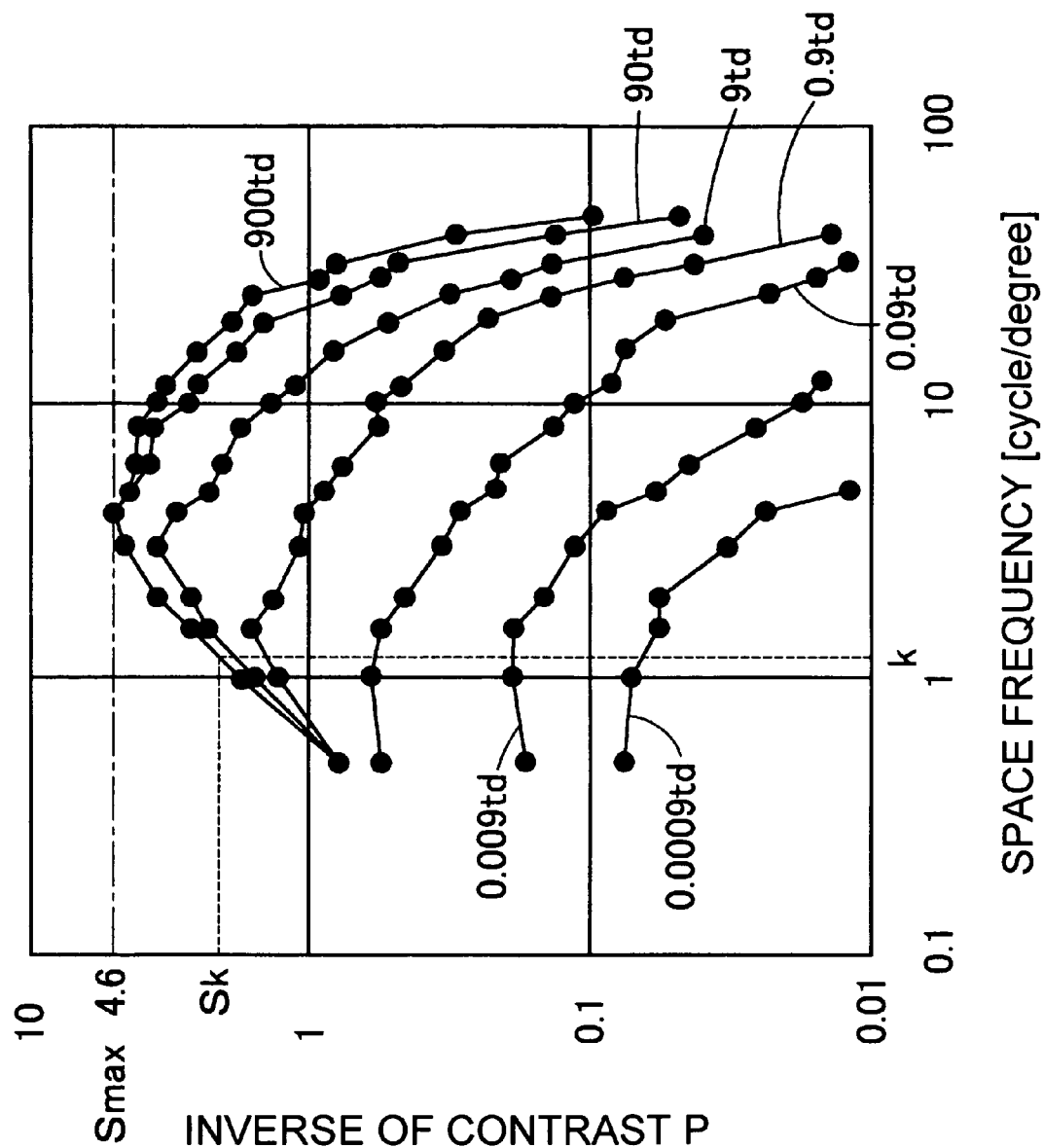
FIG. 7 shows a diagram illustrating visual feature of people's eyes.

FIG. 7 shows a diagram illustrating the visual feature of person's eyes (namely, a relationship between a space frequency of a change in luminance with respect to various average retinal illuminations and eye contrast sensitivity), and this is cited from "Handbook for Visual Information Processing, P 194, written by Masao Ohomi, 5. Visual space-time feature." The retinal illumination is used as a parameter, and an artificial pupil with diameter of 2 mm is used so that the retinal illumination is set to 0.0009 td to 900 td per×10. The unit td of the retinal illumination (Troland) is the illumination on retina, and 1 td corresponds to the illumination when a surface of 1 $cd/m^2$ is viewed through the pupil with area of 1 $mm^2$. The luminance of the general liquid crystal display is 100 to 200 $cd/m^2$, and the retinal illumination is 100 to 200 td in the case of viewing through the pupil. The luminance of the liquid crystal display 11 is, therefore, between a curved line of the retinal illumination 90 td and a curved line of the retinal illumination 900 td shown in FIG. 7.

A horizontal axis of FIG. 7 represents the number of change times in the luminance within a view angle (space frequency: cycle/degree), and a vertical axis of FIG. 7 represents an inverse number of contrast P. The respective curved lines represent a change in the value of the contrast sensitivity with respect to the change in the space frequency in the retinal illumination. For example, in the case where the retinal illumination is 900 td as shown in FIG. 7, the contrast sensitivity at the time when the space frequency is k is obtained in such a manner that a value Sk of the inverse number of the contrast P corresponding to the space frequency k is read on the contrast sensitivity curve at the time when the retinal illumination is 900 td.

Figure 8A:
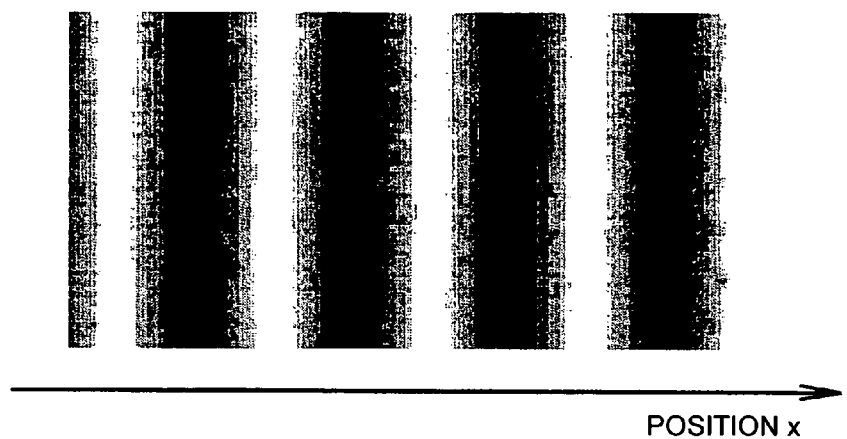
FIG. 8A shows a diagram illustrating a light pattern where the luminance changes into a sine-wave shape along one direction.
Figure 8B:
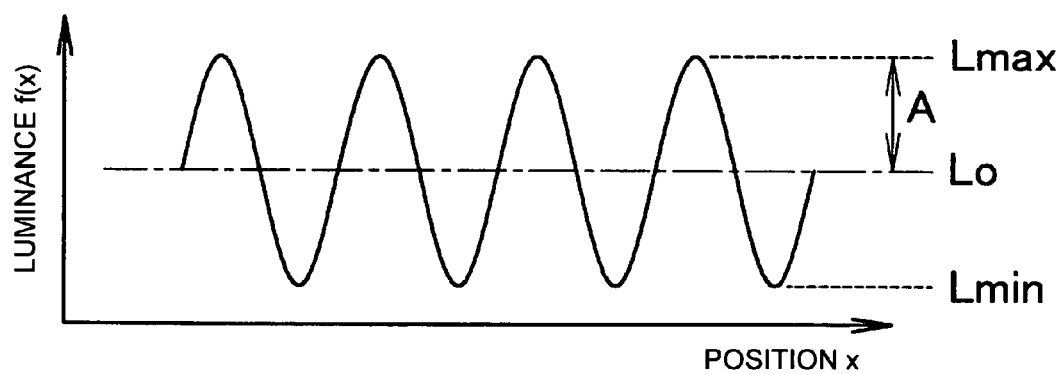
FIG. 8B shows a graph of a change in the luminance.

FIG. 8A shows a light pattern where the luminance is changed into a sine wave shape along one direction, and FIG. 8B shows a graph expressing the change in the luminance. When the luminance is changed into a sine wave shape as shown in FIG. 8B, the maximum luminance is designated by Lmax and the minimum luminance is designated by Lmin, the (Michelson) contrast P of the light pattern is defined by $$P = \frac{Lmax - Lmin}{Lmax + Lmin} \qquad \text{Mathematical Formula 1}$$

Therefore, when the center luminance of the light pattern shown in FIG. 8B is designated by Lo (=(Lmax+Lmin)/2) and an amplitude is designated by A (=Lmax−Lo=Lo−Lmin), the contrast P is expressed by $$P = A/Lo \qquad \text{Mathematical Formula 2}$$

Whether the change in the luminance can be recognized by person's vision depends on the retinal illumination, the space frequency of the change in luminance and the contrast P. In the case where the retinal illumination and the space frequency of the change in luminance has the same values, as the contrast P is larger, the recognition of the change in luminance is easier, but on the contrary, it is difficult for normal vision to (visually) recognize the change in luminance in a certain contrast range. The value Pmin of the lowest contrast P at which the change in luminance can be recognized is a contrast threshold, and its inverse number is the contrast sensitivity S. The contrast sensitivity S=1/Pmin depends on the retinal illumination and the space frequency of the change in luminance, and the contrast sensitivity S is expressed by a curved line on the graph of FIG. 7 whose horizontal axis shows the space frequency and whose vertical axis shows the inverse number of the contrast P.

The light emitted from the liquid crystal display 11 reaches an observer's eye, and is refracted by the cornea and the lens and then imaged on the retina. As shown in FIG. 7, however, the change in luminance cannot be visually recognized on the regions above the contrast sensitivity curves in certain retinal illumination. In the range of the space frequency shown in FIG. 7, all the contrast sensitivity curves have the maximum values. In certain retinal illumination, when the inverse number of the contrast P is larger than the maximum value Smax of the contrast sensitivity curve, the change in luminance is not visually recognized in any space frequencies.

In the case of the liquid crystal display, the contrast sensitivity curves where the retinal illumination is 90 td and 900 td are examined, it is noted that the contrast sensitivity becomes maximum at the space frequency of 3 to 5 cycles/degree in all the curves. Its maximum value Smax is 4.6. Since the space frequency in FIG. 7 corresponds to a pitch (roughness) of the glare on the liquid crystal display screen, and the contrast corresponds to the strength of the glare, when the inverse of the contrast P is 4.6 or more, the glare at any level of the liquid crystal display screen is not visually recognizable.

The ratio of the standard deviation $\sigma n$ to the average value $\mu c$ of the luminance on the light pattern shown in FIG. 8B is obtained. The change in luminance f (x) shown in FIG. 8B is expressed by $$f(x) = Lo + A \sin(2\pi x/\lambda) \qquad \text{Mathematical Formula (3)}$$

x represents a position (distance), and λ designates the pitch of the change in luminance. When the average value μc of the luminance is obtained by using the mathematical formula (3), it becomes the following mathematical formula (4):

$$\mu c = \frac{1}{\lambda} \int_0^\lambda f(x) \cdot dx \qquad \text{Mathematical Formula (4)}$$
$$= \frac{1}{\lambda} \int_0^\lambda \left\{ Lo + A \sin\left(\frac{2\pi x}{\lambda}\right) \right\} \cdot dx$$
$$= Lo$$

The standard deviation σc becomes the following mathematical formula (5):

$$\sigma c^2 = \frac{1}{\lambda} \int_0^\lambda (f(x) - \mu c)^2 \cdot dx \qquad \text{Mathematical Formula (5)}$$
$$= \frac{1}{\lambda} \int_0^\lambda \left\{ (Lo - \mu c) + A \sin\left(\frac{2\pi x}{\lambda}\right) \right\}^2 \cdot dx$$
$$= \frac{A^2}{2}$$

According to the mathematical formulas (4) and (5), the ration σc/μc of the standard deviation σc to the average value μc of the luminance (hereinafter, luminance scattering) is expressed by the following mathematical formula (6):

$$\sigma c/\mu c = A/((\sqrt{2}Lo) \qquad \text{Mathematical Formula (6)}$$

On the other hand, according to the mathematical formula (2), since the contrast P is expressed by A/Lo, the luminance scattering σc/μc in the mathematical formula (6) is expressed as follows by using the contrast P:

$$\sigma c/\mu c = P/((\sqrt{2}) \qquad \text{Mathematical Formula (7)}$$

Figure 9:
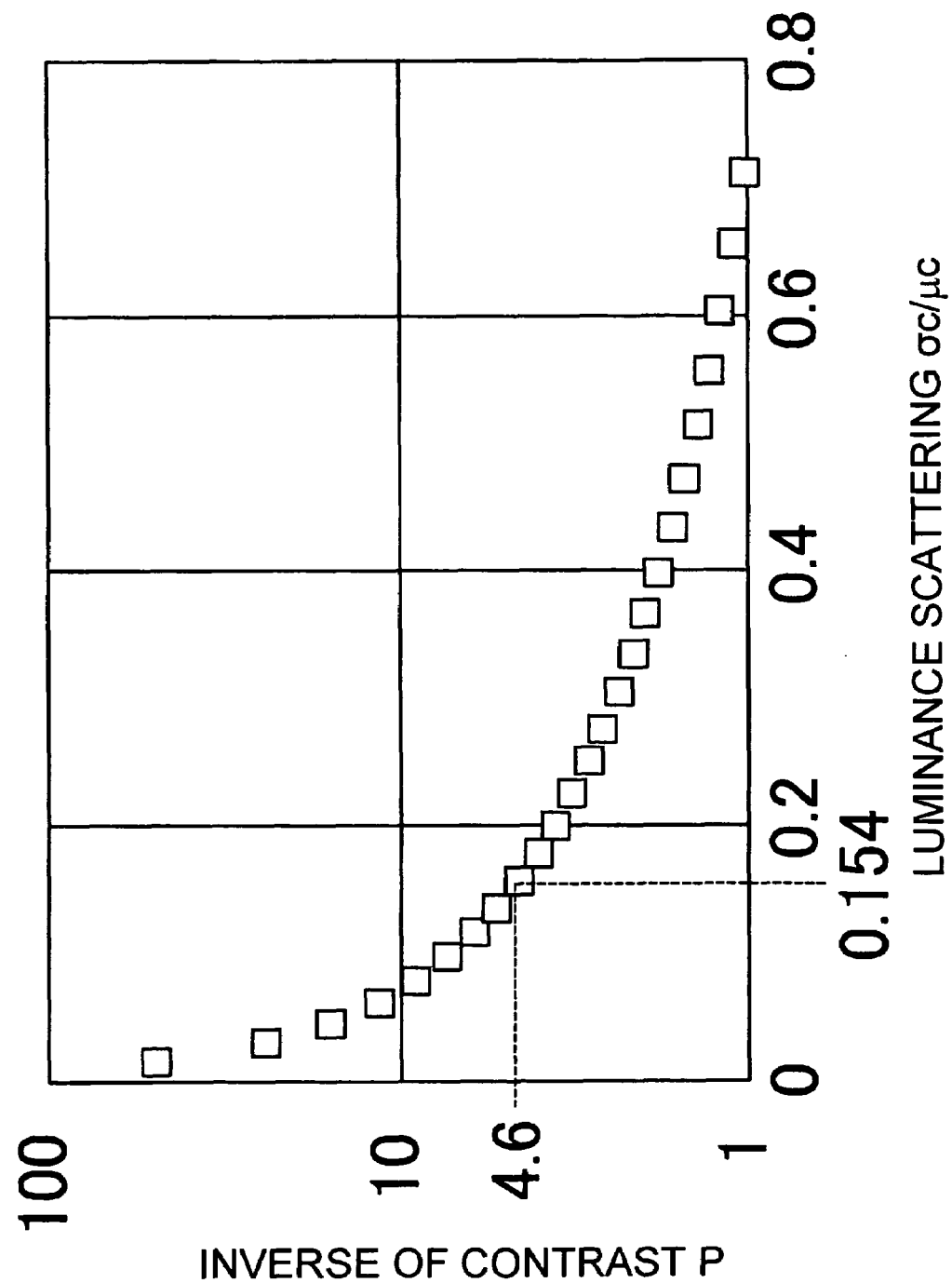
FIG. 9 shows a diagram of a relationship between luminance scattering $\sigma c/\mu c$ expressed by a mathematical formula (7) and an inverse number of contrast P.

FIG. 9 shows the relationship of the mathematical formula (7) in the case where the luminance scattering σc/μc is plotted along a horizontal axis and the inverse number of the contrast P is plotted along a vertical axis. As explained with reference to FIG. 7, the person's vision has sensitivity (to glare) when the inverse number of the contrast P is 4.6 or less, and thus when the inverse of the contrast P is larger than 4.6, the luminance scattering is not perceived. In other words, by using the luminance scattering σc/μc, as is clear from the mathematical formula (7) or FIG. 9, when the luminance scattering σc/μc is as follows:

$$\sigma c/\mu c \leq 0.154 \qquad \text{Mathematical Formula (8),}$$

the luminance scattering in each pixel cannot be perceived.

The mathematical formula (8) expresses the condition that the glare on the screen is prevented (or the glare on the screen is prevented from being perceived) using the luminance scattering in the respective pixels. The light guided into the light guide plate 22 is reflected by the deflection patterns 27 is thus emitted from the light-emitting plane 25 and passes through the respective pixels 29. For this reason, when the sizes of the deflection patterns 27 are approximately constant, the luminance of the pixels is proportional to the number of the deflection patterns 27 included in the regions corresponding to the pixels. The mathematical formula (8) can therefore be expressed by using the average number μn of the deflection patterns 27 included in the pixels and the standard deviation σn as mentioned below.

Figure 10:
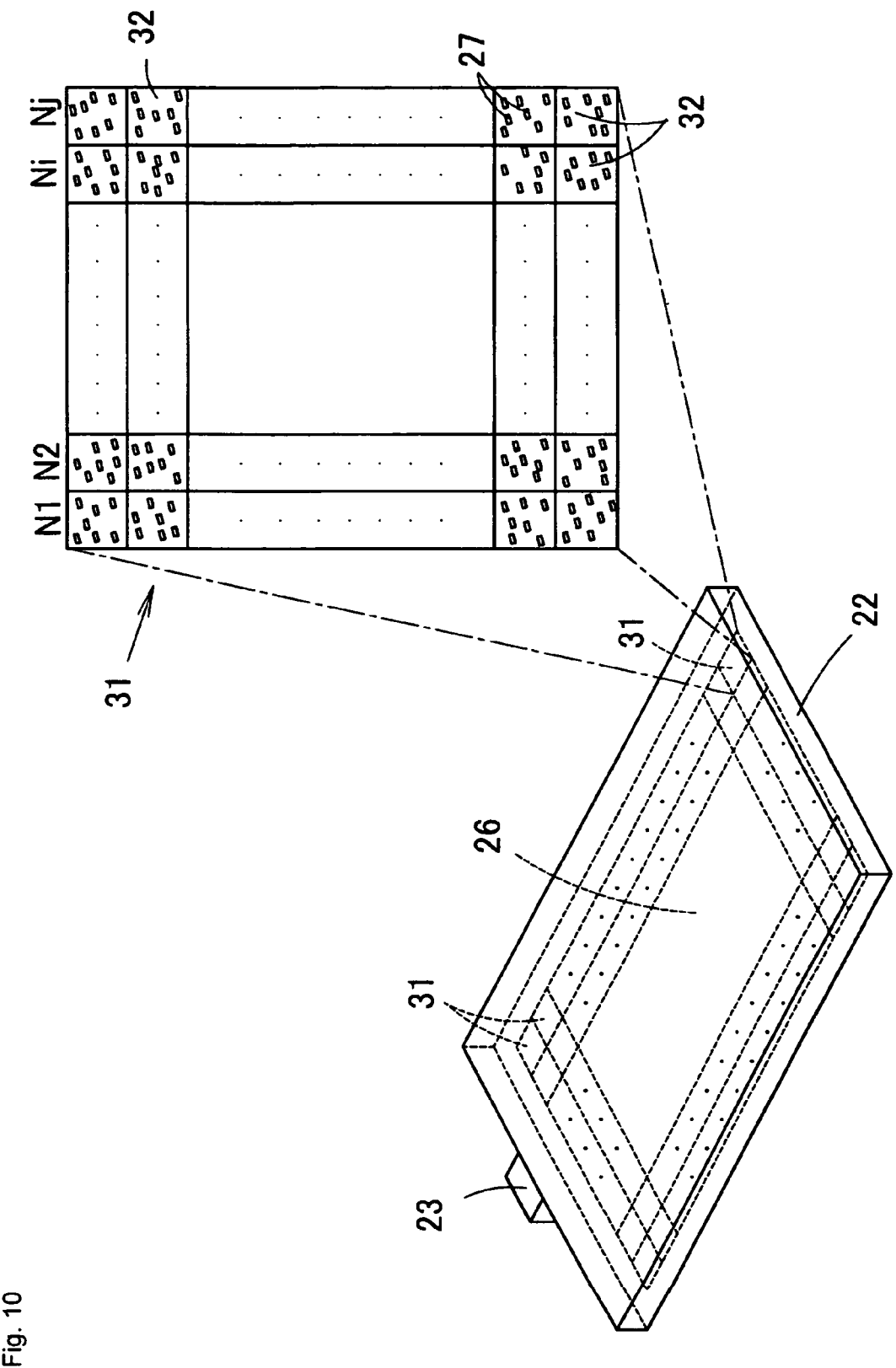
FIG. 10 shows a diagram illustrating a state that an effective region on the pattern surface of a light guide plate is divided into a plurality of sampling regions and one sampling region.

As shown in FIG. 10, the effective region on the pattern surface 26 of the light guide plate 22 (the region where the deflection patterns 27 are formed) is divided into sampling regions 31 which are minute in comparison with the entire size of the light guide plate 22 and are sufficiently larger than the pixel size. The sampling region 31 is divided into pixel corresponding regions 32 opposite respective pixels 29 of the liquid crystal panel 14. When the surface light source device 12 is overlapped with the liquid crystal panel 14, the deflection patterns 27 included in the pixel corresponding regions 32 are exposed from the corresponding pixels 29 of the liquid crystal panel 14. As shown in FIG. 10, when the number of the deflection patterns 27 included in the respective pixel corresponding regions 32 in a certain sampling region 31 is N1, N2, . . . Nn, the average number of the deflection patterns 27 in the sampling region 31 is expressed by:

$$\mu n = \Sigma N\kappa/n \quad \text{(the sum } \kappa \text{ is 1 to n)},$$

and the square of the standard deviation σn is expressed by $$\sigma n^2 = \Sigma (N\kappa - \mu n)^2/n \quad \text{(the sum } \kappa \text{ is 1 to n)}$$

Figure 11:
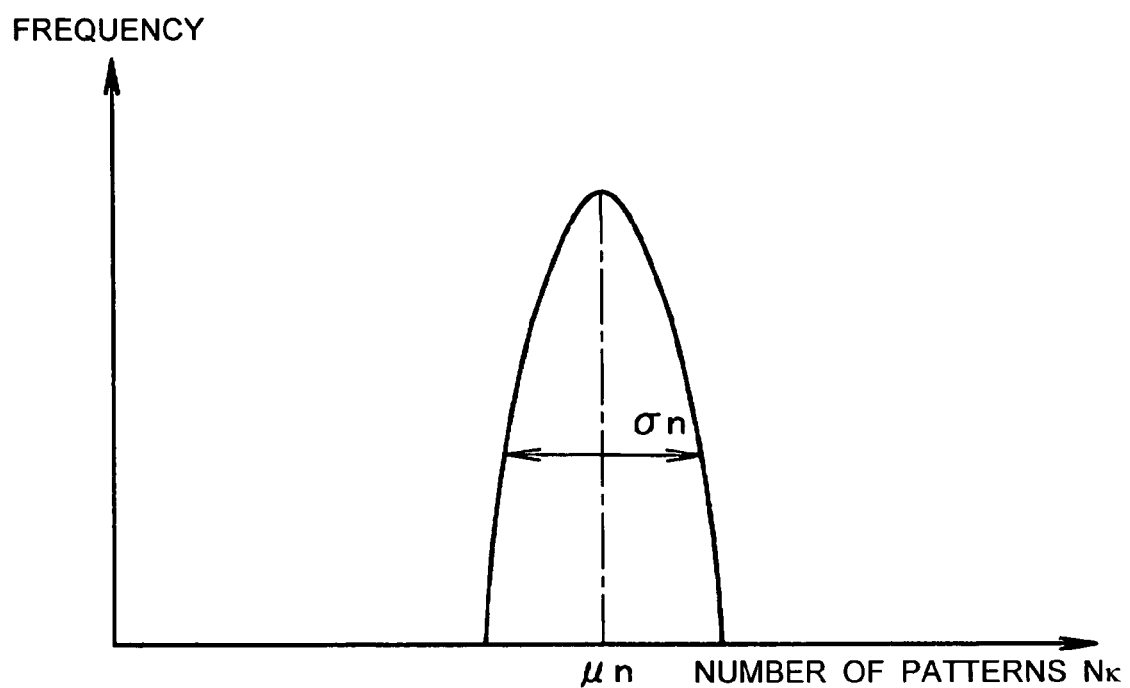
FIG. 11 shows a diagram expressing a relationship between the number of the deflection patterns included in the respective pixels in the sampling region and the frequency of appearance of the deflection patterns.

In FIG. 11, a horizontal axis shows the pattern number in each pixel, and a vertical axis shows appearance frequency. The pattern number μn expresses an approximately center value in the distribution, and the standard deviation σn expresses spread of the distribution. Since the values μn and σn are proportional to μc and σc, the mathematical formula (8) is equivalent to $$\sigma n/\mu n \leq 0.154 \quad \text{Mathematical Formula (9)}$$

Therefore, in order to make the glare on the screen of the liquid crystal display 11 unseen, in an arbitrary minute region, the ratio of the standard deviation σn to the average number μn of the deflection patterns 27 in each pixel, namely, the pattern arrangement scattering σn/μn may satisfy the following relationship:

$$0 < \sigma n/\mu m \leq 0.154 \quad \text{mathematical formula (10)}$$

The left inequality expression is a necessary condition for preventing generation of Moire fringes.

In FIG. 10, the pattern surface 26 is divided into a plurality of sampling regions 31, but when the sampling region 31 becomes as small as the size of the pixel, an appropriate statistical process cannot be executed. Further, the sampling regions 31 approach the size of the entire light guide plate 22, the glare might be seen due to local scattering. The size of the sampling regions 31 should be, therefore, set to a suitable size, and since the size which makes a person visually aware of the glare on the screen is expressed by a view angle of about 1°, in this embodiment, the view angle of about 1° is selected as the size of the sampling region 31.

Figure 12:
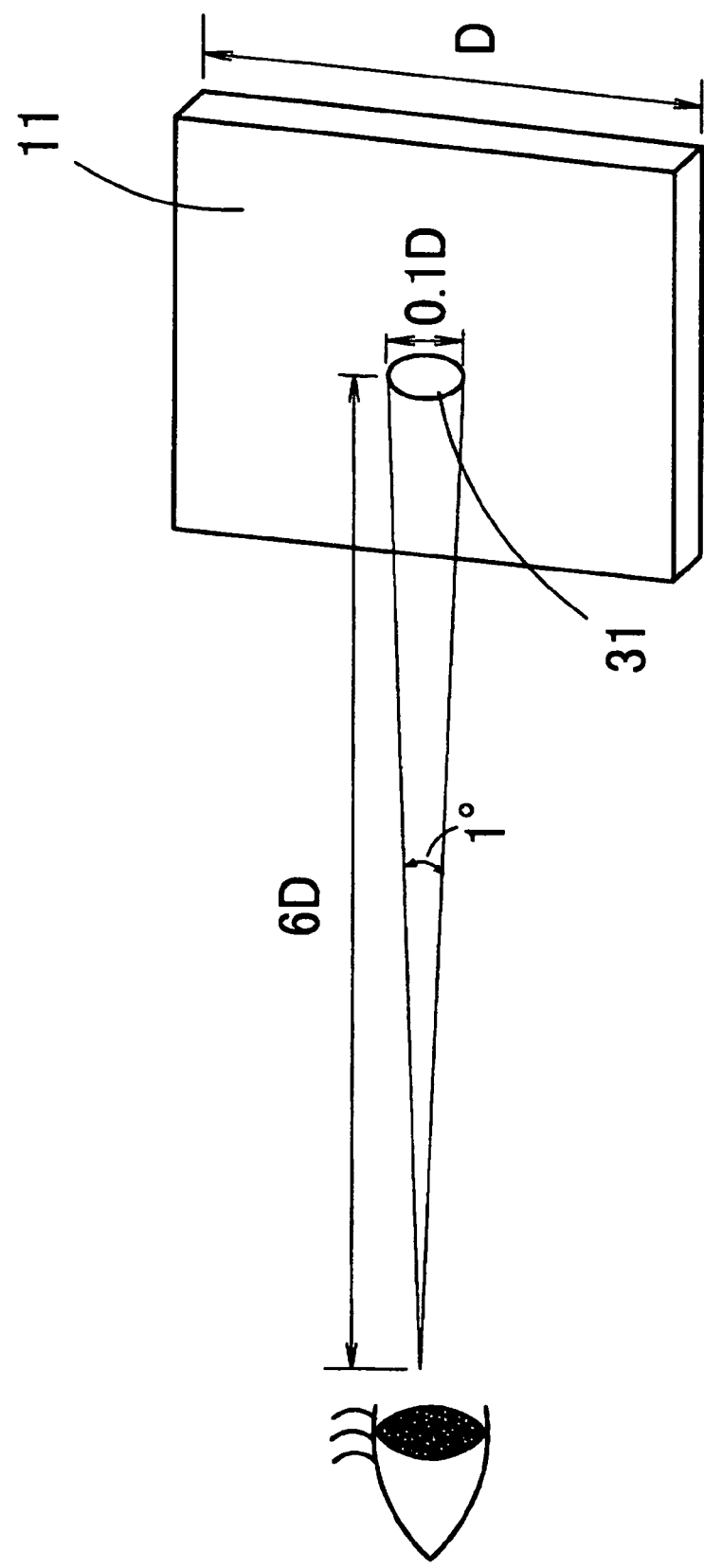
FIG. 12 shows a diagram for explaining a size of the sampling region.

When a length of one side of the liquid crystal display 11 is designated by D, as shown in FIG. 12, screen is observed mostly from the position about 6L separated from the liquid crystal display device 11. In this case, a circular region of the diameter 0.1D or a rectangular region with one side of 0.1D viewed from the observer corresponds to the view angle 1°. In such a case, therefore, the pattern surface 26 of the liquid crystal display 11 is divided into about 100 regions to make up the sampling regions 31. The sampling regions 31 are sufficiently larger than the pixel size, and include the space frequency corresponding to the maximum contrast sensitivity of the contrast sensitivity curved line. For example, since the size of the screen is about 50 mm in mobile terminals such as cellular phones, the sampling regions 31 have a diameter or one side of about 5 mm (or about 4 to 6 mm). In other words, recognizable glare in the sampling regions 31 is the glare on the screen which is the problem of the present invention.

Figure 13B:
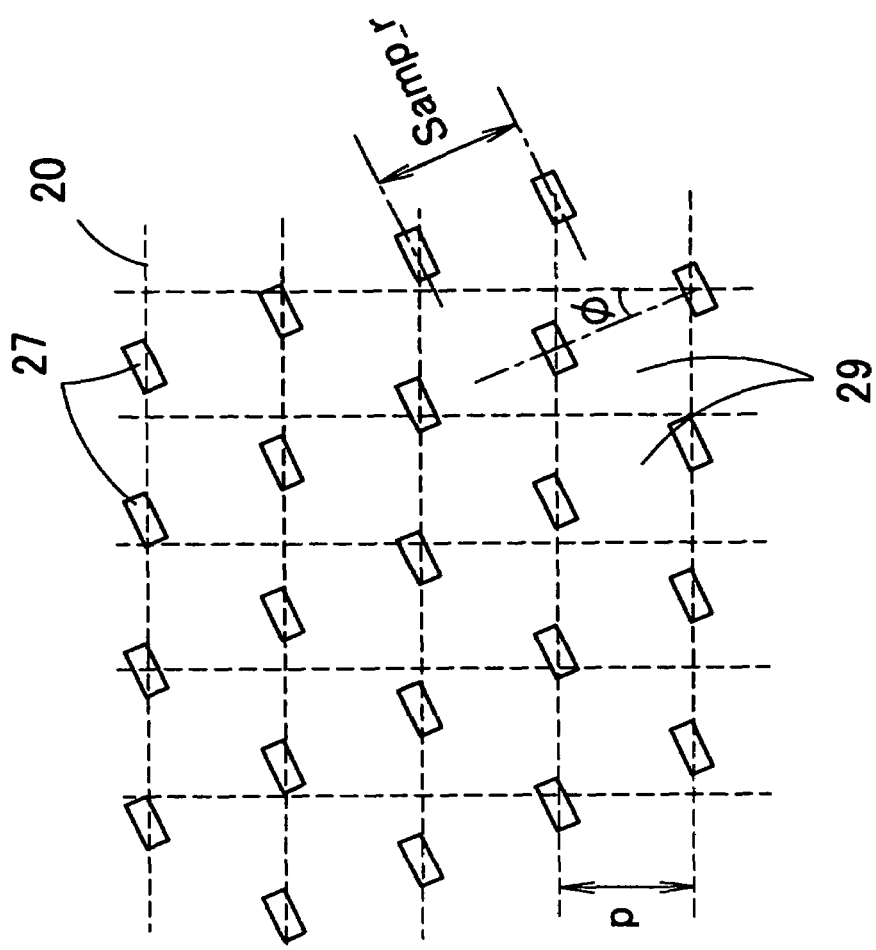
FIGS. 13A and 13B show diagrams explaining reasons that Moire fringes are generated in a case where the deflection patterns are arranged regularly.
Figure 13A:
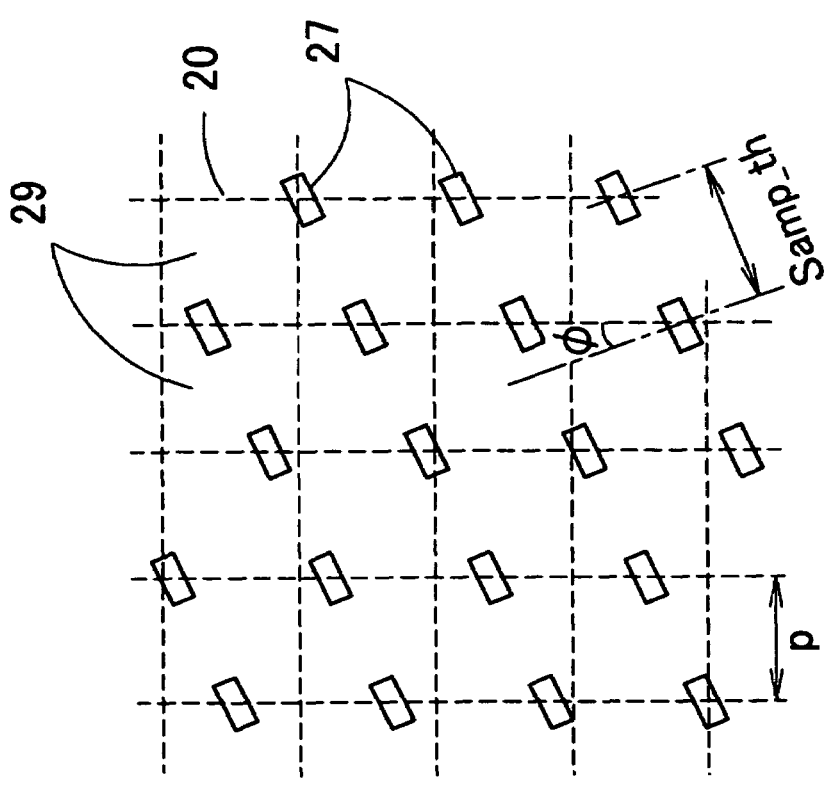

The method of eliminating Moire fringes according to an embodiment of the invention is explained below. FIGS. 13A and 13B explain the reason for generation of the Moire fringes in the case where the deflection patterns 27 are arranged regularly. As shown in FIG. 3, the deflection patterns 27 are arranged discretely on the concentric circle about the light source 23, but when the deflection patterns 27 are arranged with approximately uniform gap, a portion where the deflection patterns 27 and the black matrices 20 are overlapped with each other is present, and this causes Moire fringes. When the arrangement of the deflection patterns 27 has any regularity, Moire fringes are generated. The case where the arrangement in a circumferential direction and a radial direction has regularity is explained with reference to FIGS. 13A and 13B.

FIG. 13A shows the case where the deflection patterns 27 are arranged along the circumferential direction with constant pitch Samp_th. In this case, in a region in a direction where the deflection patterns 27 tilt at an angle ϕ with respect to the front side of the light source 23, the following relationship is satisfied:

$$Samp\_th \times \cos \phi = p \text{ (p: the pixel pitch)},$$

the black matrices 20 in the vertical direction and the deflection patterns 27 are overlapped with each other as shown in FIG. 13A. For this reason, the light is not emitted from the pixels 29, and dark portions are generated in the ϕ direction, and thus contrasting is generated between these portions and the other portions. Such contrasting is observed as Moire fringes.

FIG. 13B shows the case where the deflection patterns 27 are arranged along the radial direction with constant pitch Samp_r. In this case, in regions in a direction where the deflection patterns 27 tilt at angle ϕ so that the following relation ship is satisfied:

$$Samp\_r \times \cos \phi = p \text{ (p: the pixel pitch)},$$

as shown in FIG. 13B, the black matrices 20 in the horizontal direction and the deflection patterns 27 overlap with each other. For this reason, the light is not emitted from the pixels 29, and dark portions are generated in the ϕ direction, and thus contrasting is generated between these portions and the other portions. Such contrasting is observed as Moire fringes.

FIGS. 14 and 15 explain the method of arranging the deflection patterns 27 so that the Moire fringes are not generated. Moire fringes can be eliminated by arranging the deflection patterns 27 randomly, but in this arrangement, another feature of the liquid crystal display 11 or the surface light source device 12 is ignored. The method explained below is for suppressing the generation of Moire fringes while the feature required by the liquid crystal display 11 or the surface light source device 12 is maintained as much as possible. The case where the light source 23 is the point light source is explained. r represents the radial direction about the light source 23, and θ represents the circumferential direction about the light source 23.

Figure 14A:
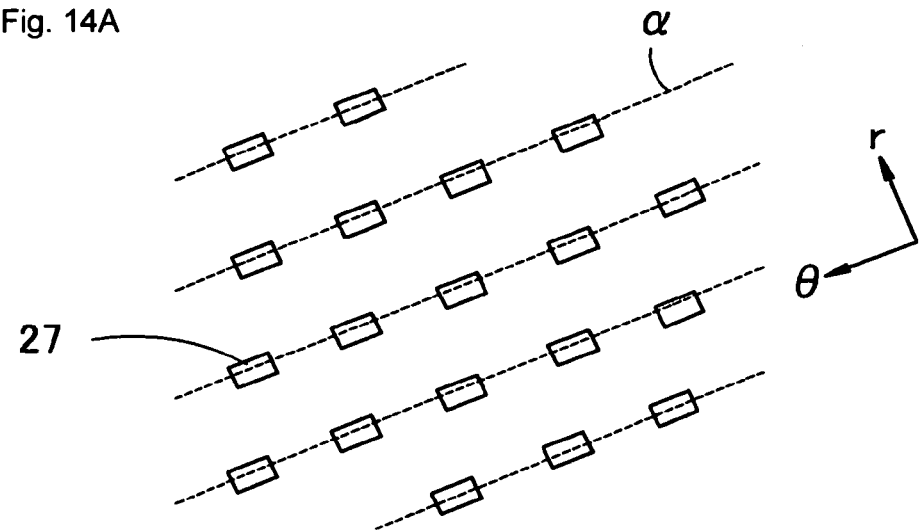
FIGS. 14A to 14C show diagrams explaining a method of arranging the deflection patterns so that the Moire fringes are not generated.

As shown in FIG. 14A, the deflection patterns 27 are regularly and discretely arranged on the concentric circle α about the light source 23 in the minute sampling region (step S1). In this state, the pattern arrangement scattering σn/μn has a constant value which is different in the respective minute sampling regions. The deflection patterns 27 arranged regularly are moved gradually to the radial direction (r) and the circumferential direction (θ) by using random numbers (step S2). At this time, independent random numbers are used in the radial direction and the circumferential direction. When the deflection patterns 27 are moved, the pattern arrangement scattering σn/μn becomes larger than an original value.

Figure 14B:
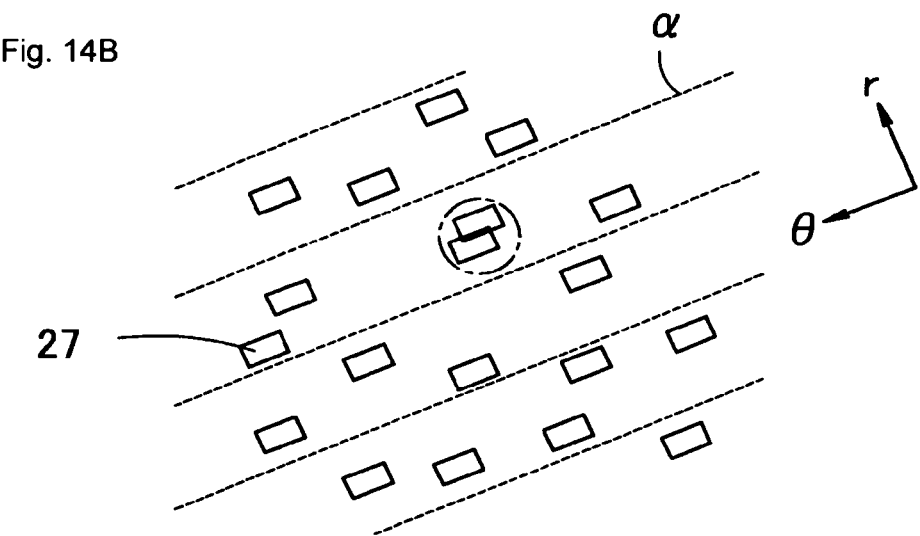
Figure 15A:
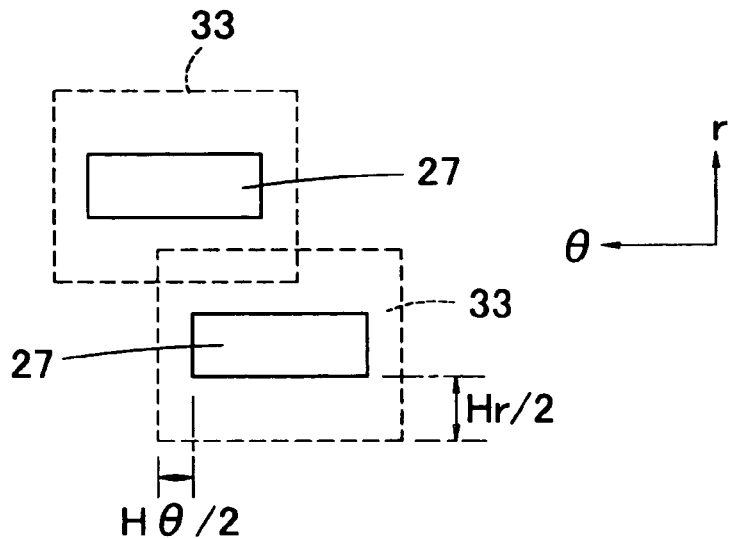
FIGS. 15A to 15C show diagrams explaining a processing method when the deflection patterns are overlapped.

When the deflection patterns 27 are moved by using the random numbers at step S2, as shown in a circle indicated by alternate long and two short dash line of FIG. 14B, the moved deflection patterns 27 occasionally overlap with each other. For this reason, after the deflection patterns 27 are moved, the overlapping of the deflection pattern 27 is determined (step S3). When the overlapping is determined, a buffer region 33 is assumed around the deflection patterns 27. That is, as shown in FIG. 15A, the buffer region 33 with width of Hr/2 is provided to both sides of the deflection pattern 27 in the radial direction, and the buffer region 33 with width of Hθ/2 is provided to both sides in the circumferential direction. As a result, the buffer regions 33 are assumed around the deflection patterns 27. In the case where the buffer regions 33 around the deflection patterns 27 are overlapped with each other as shown in FIG. 15A, the determination is made that the deflection patterns 27 are overlapped with each other. The buffer region 33 is set so that a relationship Hr>Hθ is satisfied because the width Hr becomes a shade for the previous deflection pattern 27 and thus the light cannot be efficiently utilized. That is, the minimum gap between the deflection pattern 27 and the adjacent deflection pattern 27 is Hr in the radial direction and Hθ in the circumferential direction, is arranged so that the gap in the radial direction is larger than that in the circumferential direction.

Figure 14C:
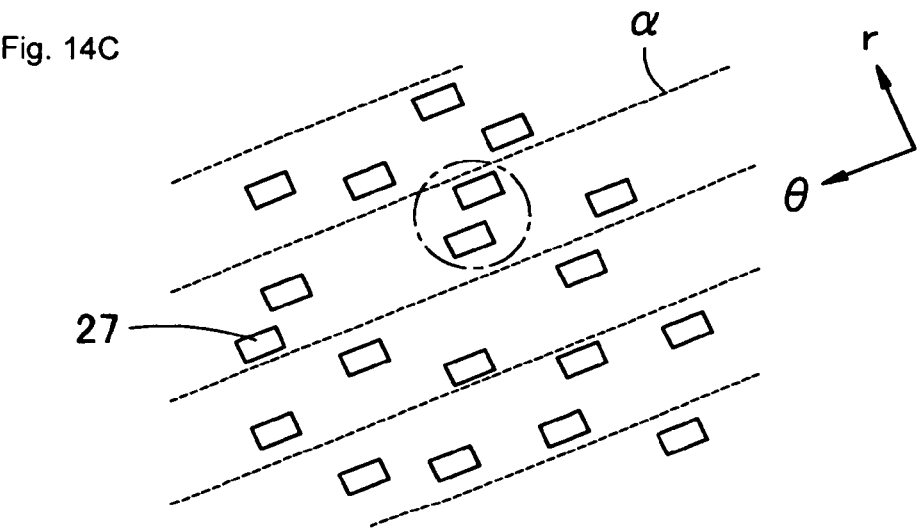
Figure 15B:
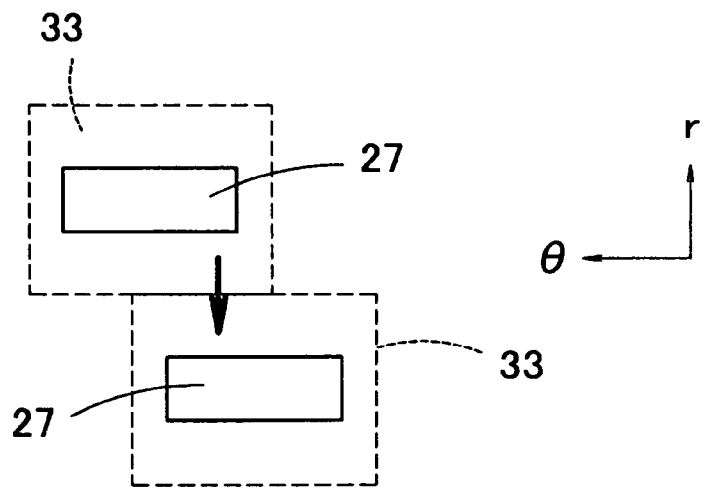
Figure 15C:
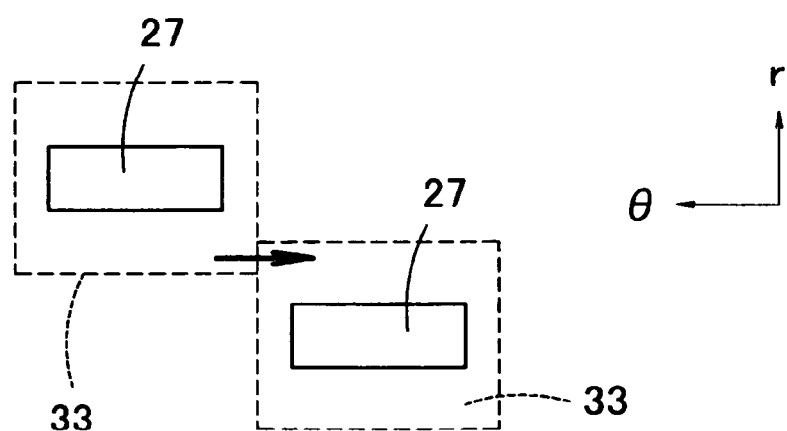

As to the deflection patterns 27 shown in FIG. 15A which are determined to be overlapped with each other at the overlapping determination, at least one of the deflection patterns 27 is suitably moved as shown in FIG. 14C. For example, as shown in FIG. 15B, the deflection patterns 27 are moved to the circumferential direction until the buffer regions 33 are adjacent to each other, or they are moved to the radial direction until the buffer regions 33 are adjacent to each other as shown in FIG. 15C (step S4). The deflection patterns 27 which are not overlapped are not moved.

The pattern arrangement scattering σn/μn in the sampling region 31 is calculated (step S5), and when a relationship σn/σn≦0.154 is satisfied, the pattern arrangement in the sampling region 31 is determined. When the relationship σn/μn≦0.154 is not satisfied, the sequence returns to the first step so that the number of the deflection patterns 27 is changed and the deflection patterns 27 are rearranged or they are brought into the minimum arrangement state (FIG. 14A) and are again moved by using different random numbers. The steps 1 to 5 are repeated until the distribution of the deflection patterns 27 satisfies the relationship σn/μn≦0.154 in the sampling regions 31 extracted at least arbitrarily from the light guide plate 22.

When the arrangement of the deflection patterns 27 is determined in the sampling regions 31, the process is ended. As to the obtained deflection patterns 27 obtained as a result, since the pattern arrangement scattering is 0.154 or less, the luminance scattering is small and thus the glare on the screen is eliminated. Further, since the arrangement of the deflection patterns 27 is random, Moire fringes are in no danger of being generated. Since a diffusion plate should not be used unlike the conventional example, the front surface luminance of the liquid crystal display 11 is in no danger of being reduced, and an expensive prism sheet is not necessary. As is clear from the above explanation, in general, when the patterns are arranged regularly in order to reduce glare, Moire fringes are generated, and when randomness of the patterns is heightened in order to prevent the generation of Moire fringes, glare occurs. That is, the generation of Moire fringes and the glare on the screen establish a trade-off relationship, and the pattern arrangement scattering in the sampling regions should satisfy the relationship σn/μn≦0.154 as the restraint condition of randomness in the present invention. The condition Hr>Hθ of the buffer regions acts in a direction where the randomness is reduced. That is, in several aspects of the invention, the deflection pattern arrangement has the randomness as to two independent components does not mean that the deflection patterns can move freely completely, but means that the deflection pattern has limited randomness with the two restraint conditions including statistical property of the pattern arrangement scattering and directional property of the minimum gap between the patterns.

Figure 16:
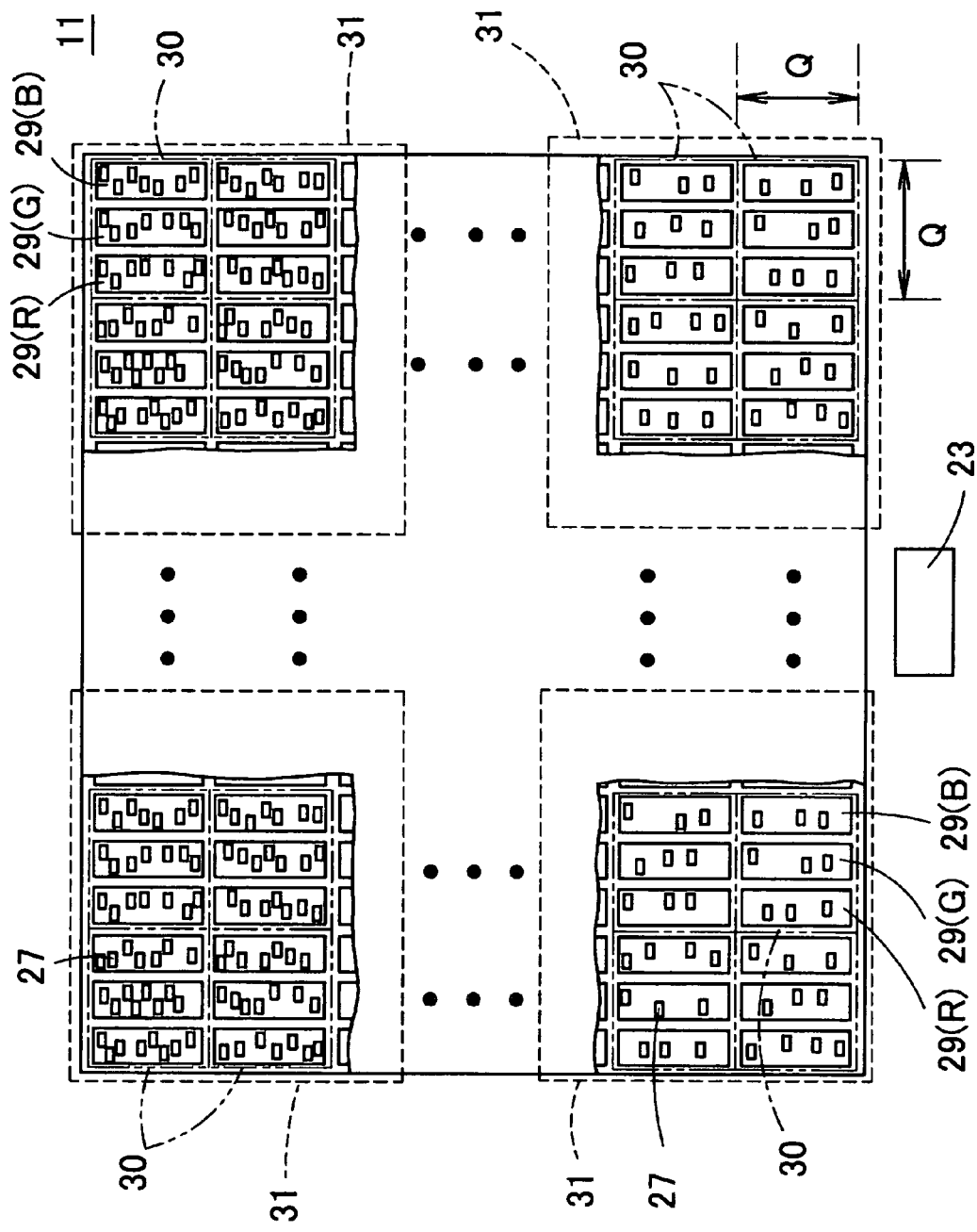
FIG. 16 shows a schematic pattern diagram illustrating concrete examples of a liquid crystal display according to the first embodiment.

An example of the liquid crystal display 11 where the deflection patterns 27 are arranged by the above method is explained below with reference to FIGS. 16 and 17. FIG. 16 is a schematic pattern diagram of the liquid crystal display 11. In the liquid crystal display 11, the three pixels 29 having the red filter R, the green filter G and the blue filter B, respectively, compose one picture element 30, and the pitch Q of the picture elements 30 is 170 μm. The pattern surface 26 of the light guide plate 22 is divided into the 5.2-mm sampling regions, and one sampling region 31 includes 30×30 pixels 30 (or 90×90 pixels 29). The pixels 29 are arranged into a matrix pattern by using a rectangular material as shown in FIG. 16.

Figure 17A:
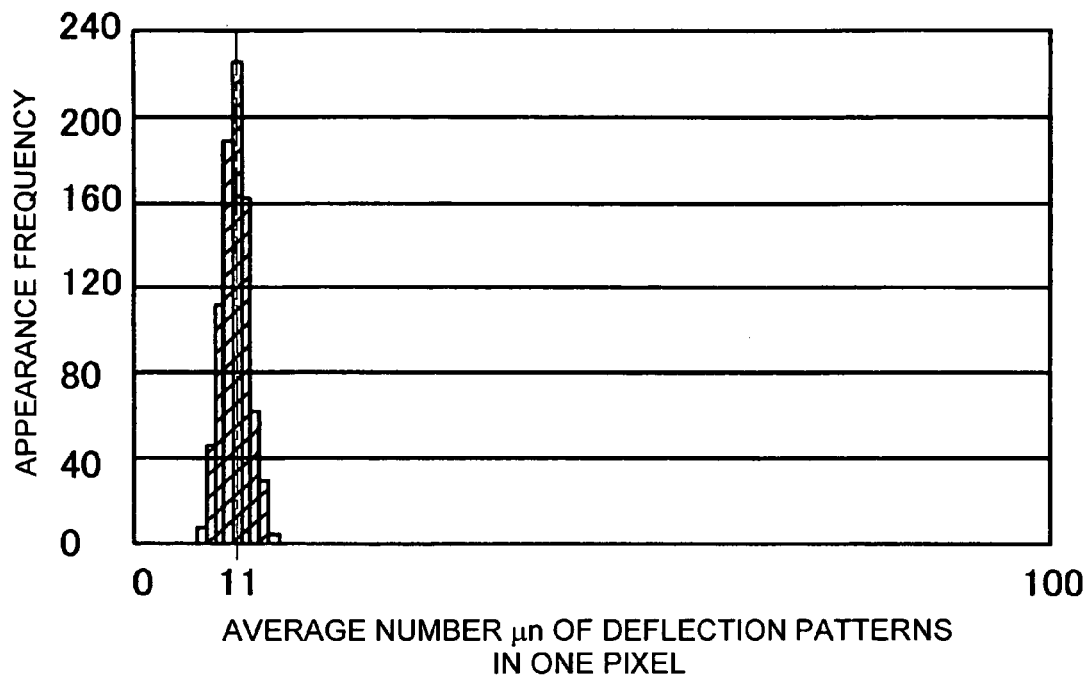
FIG. 17A shows a histogram expressing distribution of the appearance frequency of the deflection patterns with the average number $\mu n$ included in one pixel in the sampling region near a light source.
Figure 17B:
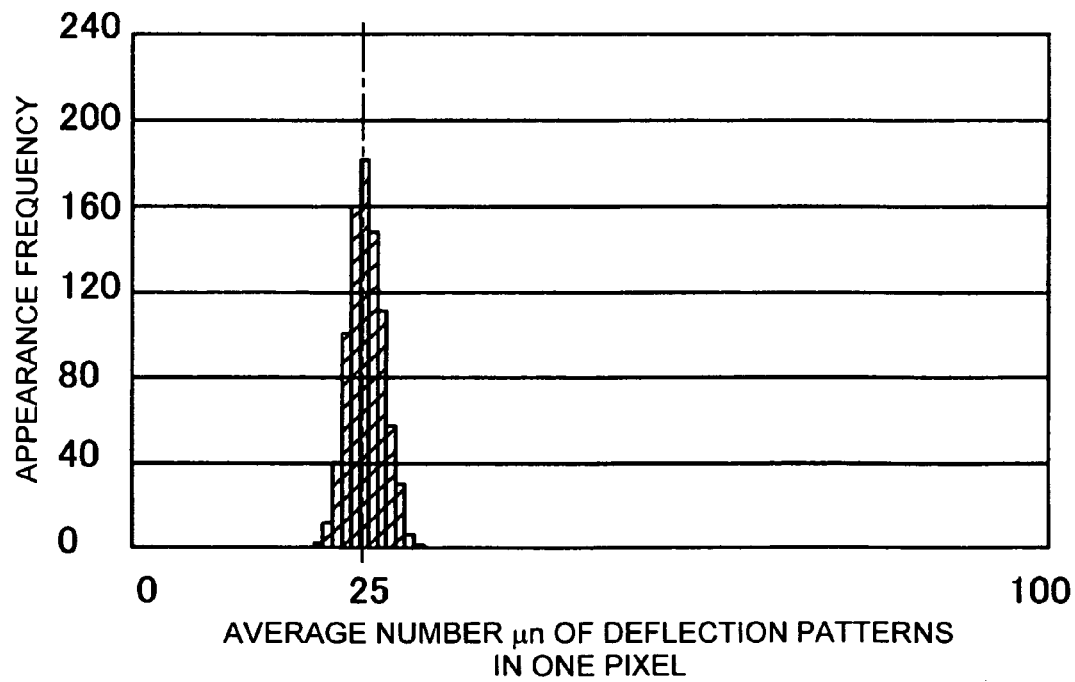
FIG. 17B shows a histogram expressing distribution of the appearance frequency of the deflection patterns with the average number μn included in one pixel in the sampling region far from the light source.

As shown in FIG. 16, the number of the deflection patterns 27 included in one pixel 29 increases towards a direction separated from the light source 23. In the sampling regions 31 near the light source 23, the deflection patterns 27 are arranged so that the average number μn of the deflection patterns 27 included in one pixel 29 is 11 and the standard deviation σn of the deflection patterns 27 included in one pixel 29 is 1.5. FIG. 17A shows a histogram illustrating distribution of appearance frequency of the deflection patterns 27 with average number μn in one pixel obtained by taking statistics in the sampling regions 31 near the light source 23. In the sampling region 31 which is the farthest from the light source 23, the deflection patterns 27 are arranged so that the average number μn of the deflection patterns 27 included in one pixel 29 is 25 and the standard deviation σn of the deflection patterns 27 included in one pixel 29 is 1.8. FIG. 17B shows a histogram illustrating distribution of appearance frequency of the deflection patterns 27 with average number μn in one pixel obtained by taking statistics in the sampling region 31 which is the farthest from the light source 23. This is because the irregular luminance of the entire light guide plate 22 is prevented. That is, the deflection patterns 27 are arranged so that σn/μn is 0.136 near the light source 23, σn/μn is 0.072 in the positions separated from the light source 23, and the relationship σn/μn≦0.154 is satisfied in all the sampling regions 31 of the light guide plate 22. As a result, the glare on the screen is suppressed, and the liquid crystal display 1 having uniform luminance on the entire screen can be manufactured.

The number of the deflection patterns 27 included in each pixel 29 in the sampling regions 31 falls within a constant scattering range, and the deflection patterns 27 are arranged randomly. As a result, the luminance scattering of each pixel 29 can be set within a predetermined range, and an observer does not recognize the glare on the screen and the More fringes, so that a clear image can be obtained.

Figure 18A:
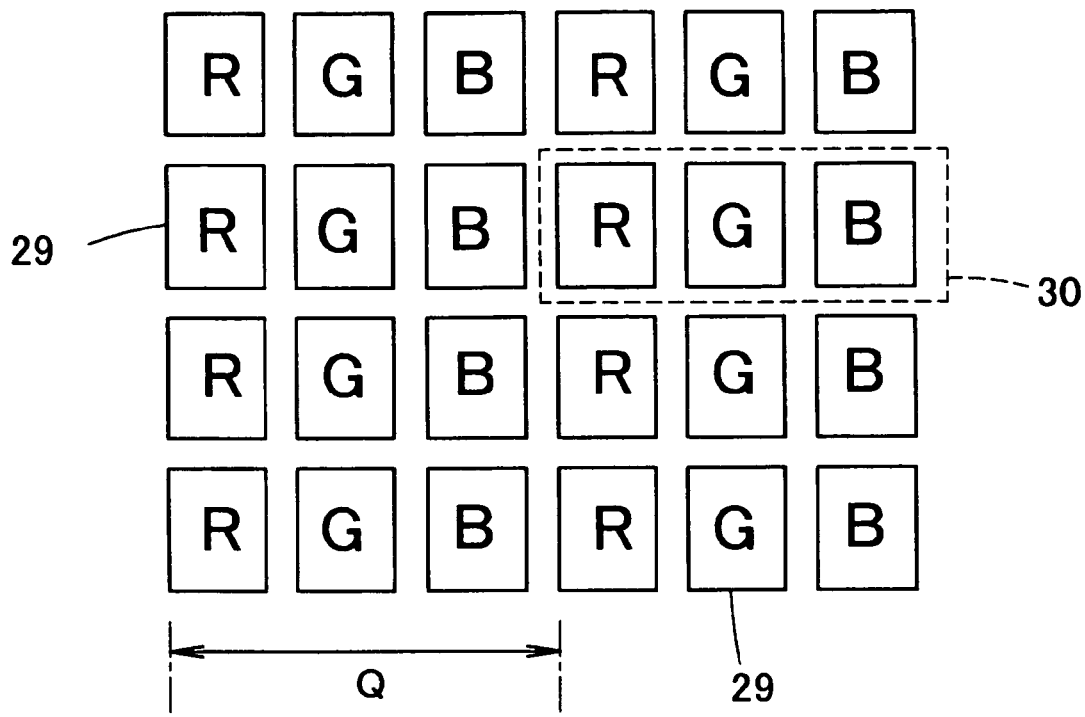
FIG. 18A shows a diagram of the pixels arranged in a stripe form.
Figure 18B:
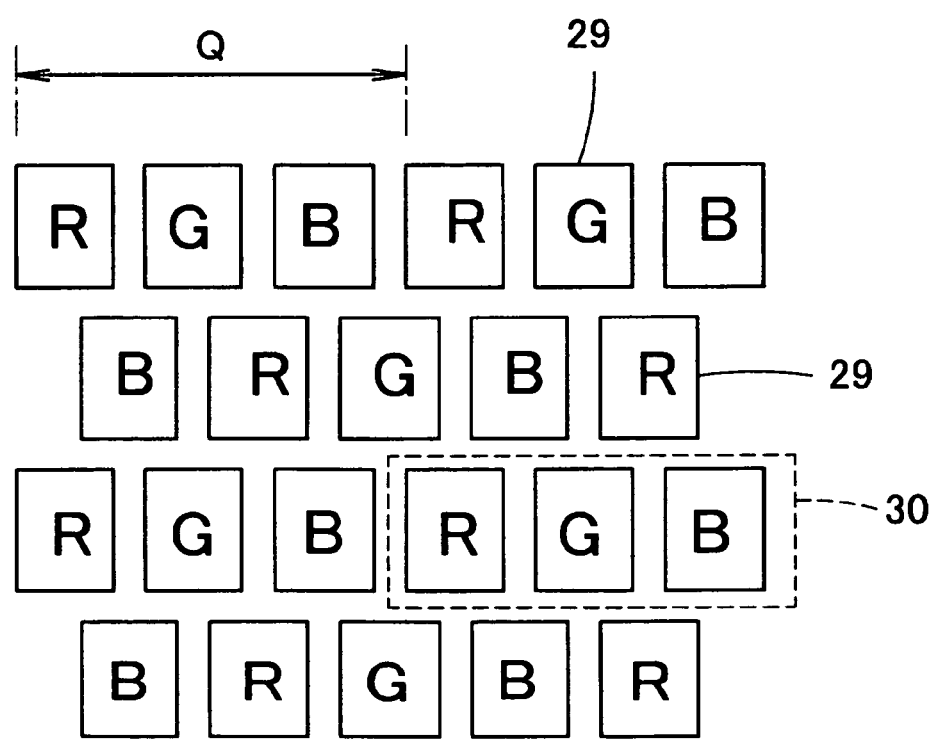
FIG. 18B shows a diagram of the pixels arranged in a delta form.

The arrangement of the pixels 29 may be a stripe arrangement as shown in FIG. 18A, or may be a delta arrangement where the pixels 29 adjacent in an up-down direction shift in a right-left direction by the pixel pitch Q of ½ as shown in FIG. 18B.

The deflection patterns 27 are arranged over the plural pixels 29, but in this case, a pixel 29 to which the center (gravity point) of the deflection patterns 27 belongs or where the deflection patterns 27 occupy the largest area may be that pixel 29.

When the arrangement of the deflection patterns 27 is determined, it is desired that the distribution of the deflection patterns 27 in all the sampling regions 31 of the light guide plate 22 satisfies the relationship: $\sigma n/\mu n \leq 0.154$. The distribution of the deflection patterns 27 may, however, satisfy the relationship $\sigma n/\mu n \leq 0.154$ in a plurality of sampling regions 31 extracted from at least arbitrarily from the light guide plate 22. For example, the distribution may satisfy $\sigma n/\mu n \leq 0.154$ in a suitable percentage, for example, 50% of all the sampling regions 31.

When the liquid crystal display 11 is assembled, the liquid crystal panel 14 might displace from the light guide plate 22. In order to reduce an influence of the displacement, it is desirable that the deflection patterns are arranged randomly in a scattering manner, whereas the deflection patterns are distributed approximately uniformly in a pixel corresponding region.

In the first embodiment, the distribution establishes the relationship $\sigma n/\mu n \leq 0.154$ in a range where the glare on the screen is not observed on data with the retinal illumination of 900 td, namely, when the inverse number of the contrast P is 4.6 or more. The performance which is required by the liquid crystal display 11 or the surface light source device 12, however, varies according to types of products into which the liquid crystal display 11 or the surface light source device 12 is incorporated. For this reason, a suitable value may be set for each liquid crystal display.

As a modified example of the first embodiment, the average number μn and the standard deviation σn of the deflection patterns 27 included in the pixels 29 are not changed on the entire surface of the light guide plate 22. For example, the deflection patterns 27 are arranged so that μn is 10 and σn is 1.3 in an arbitrary pixel corresponding region. As a result, the relationship $\sigma n/\mu n = 0.13 \leq 0.154$ is satisfied in all the sampling regions 31 in the light guide plate 22, and thus a satisfactory image without the glare on the screen can be obtained.

As another modified example of the first embodiment, in the entire light guide plate 22, even if the average number μn and the standard deviation σn of the deflection patterns 27 in the pixels 29 do not satisfy the relationship $\sigma n/\mu n \leq 0.154$, the relationship $\sigma n/\mu n \leq 0.154$ may be satisfied in each sampling regions 31. For example, in the light guide plate 22 where the size of the sampling regions 31 is 4-mm square and twenty-three pixels 29 are arranged in the horizontal and vertical directions on each sampling region 31, the number of the deflection patterns included in each pixel 29 is 10 to 30, and σn/μn in the entire light guide plate 22 is about 0.3. However, when the relationship $\sigma n/\mu n \leq 0.154$ is satisfied in each sampling region 31, the observer can see a satisfactory image without glare.

Since the entire constitution of the liquid crystal display in a second embodiment is similar to that in the first embodiment, like members are explained by using like reference numerals. In the second embodiment, a ratio of the pixel pitch p of the pixel panel 14 to the average pattern gap Samp_A of the deflection patterns 27 satisfies the following relationship:

$$Samp\_A/p \leq 0.28$$

For example, the pixel pitch p may be 160 μm, and the average pattern gap Samp_A may be 44.8 μm or less.

When the pattern surface 26 of the light guide plate 22 is divided into square regions (they are not necessarily the same as the sampling regions 31) having one side of K (for example, 5 to 10 mm), if the square regions include the M-numbered deflection patterns 27, the average pattern gap Samp_A of the deflection patterns 27 in the square regions is defined by the following relationship:

$$Samp\_A = K/(\sqrt{M}).$$

The average pattern gap Samp_A means an average distance between the centers of the deflection patterns 27 in the square regions as is clear from the following relationship:

$$(Samp\_A)^2 \times M = K^2$$

Figure 19:
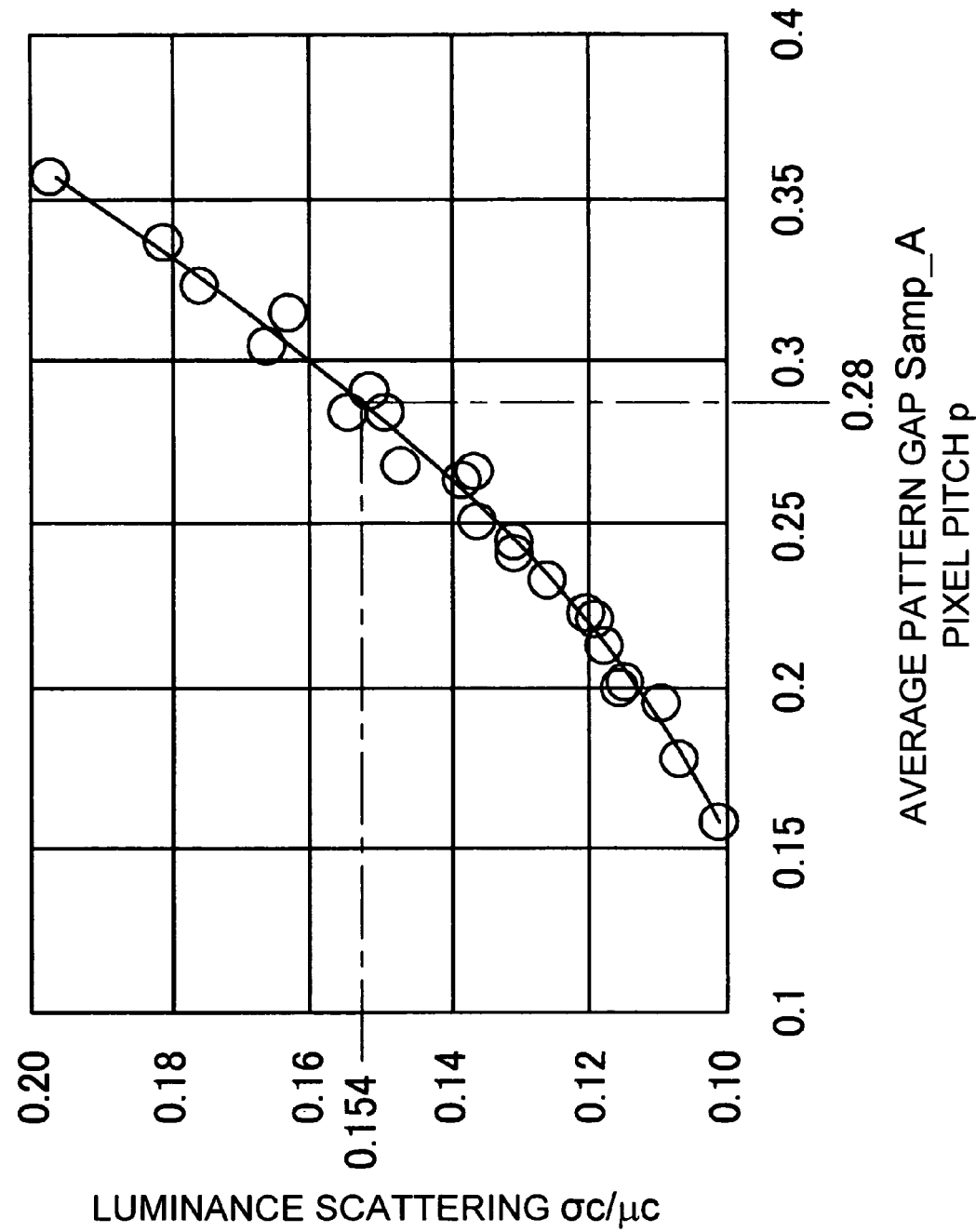
FIG. 19 shows a diagram explaining the grounds of a second embodiment.

FIG. 19 shows a diagram explaining the grounds of the second embodiment. FIG. 19 shows results of preparing samples having different ratios Samp_A/p of the pixel pitch to the average pattern gap using the liquid crystal display where the deflection patterns 27 are arranged according to the arrangement method explained with reference to FIGS. 14 and 15 in the first embodiment and measuring the values of the luminance scattering σc/μc. As is clear from this drawing, the ratio Samp_A/p of the pixel pitch to the average pattern gap and the luminance scattering σc/μc satisfy a constant relationship. According to the measured result in FIG. 19, when the ratio Samp_A/p of the pixel pitch to the average pattern gap is 0.28 or less, the luminance scattering satisfies the relationship $\sigma c/\mu c \leq 0.154$.

In the liquid crystal display of the second embodiment, therefore, the arrangement density of the deflection patterns 27 is determined so that the ratio of the pixel pitch p to the average pattern gap Samp_A in each square region of predetermined size satisfies a relationship $Samp\_A/p \leq 0.28$. As a result, similarly to the first embodiment, the glare on the screen is suppressed and a satisfactory image can be displayed.

Figure 20:
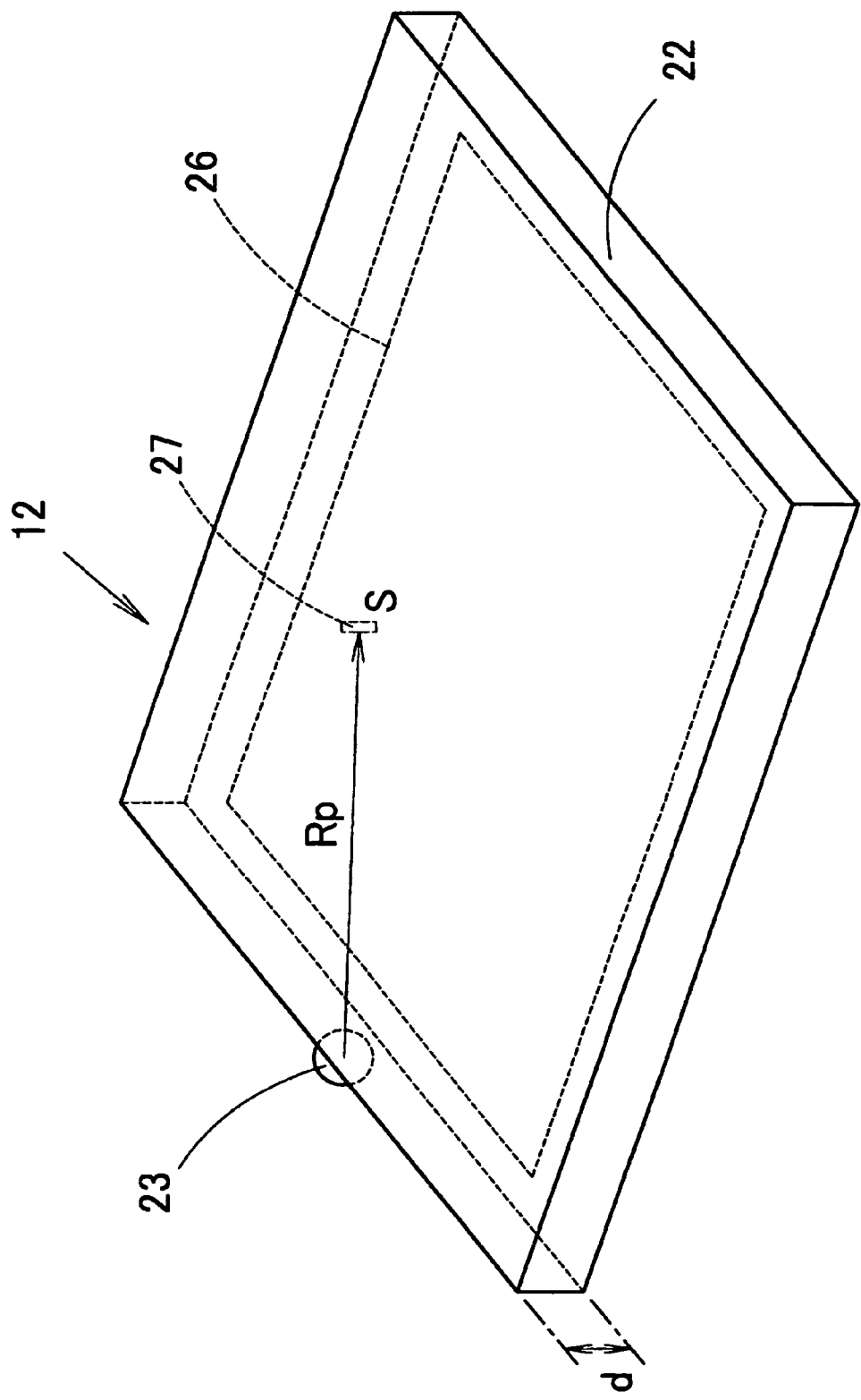
FIG. 20 shows a perspective view illustrating a surface light source device to be used in a liquid crystal display according to a third embodiment.
Figure 21A:
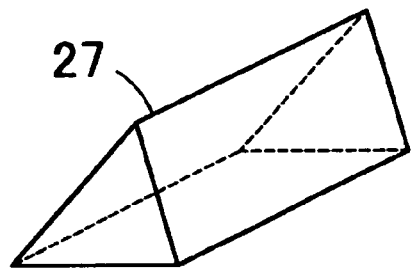
FIGS. 21A to 21C show a perspective view, a sectional view and a plan view of a deflection patterns having a certain shape formed on a pattern surface of a surface light source device according to the third embodiment.
Figure 21D:
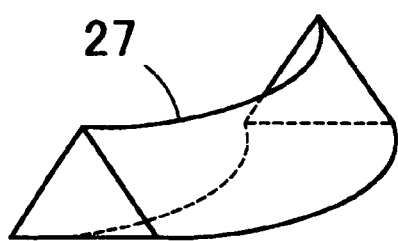
FIGS. 21D to 21F show a perspective view, a sectional view and a plan view of deflection patterns having a different shape.
Figure 21B:
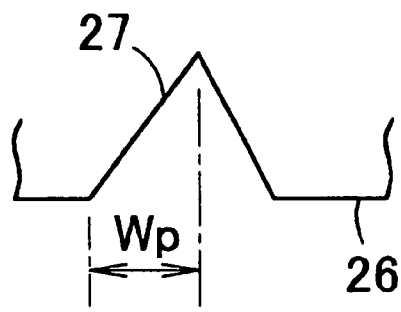
Figure 21E:
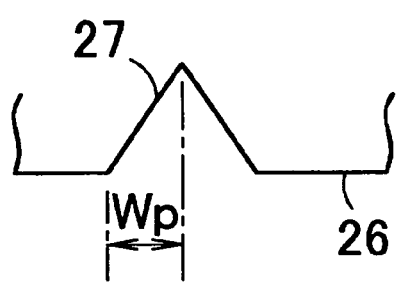
Figure 21C:
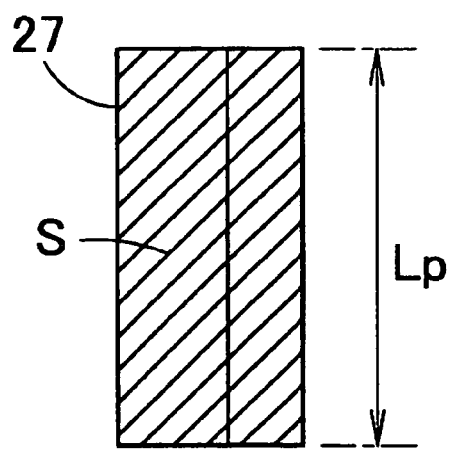
Figure 21F:
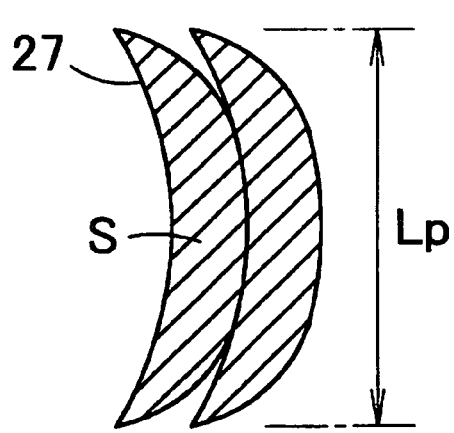
Figure 22A:
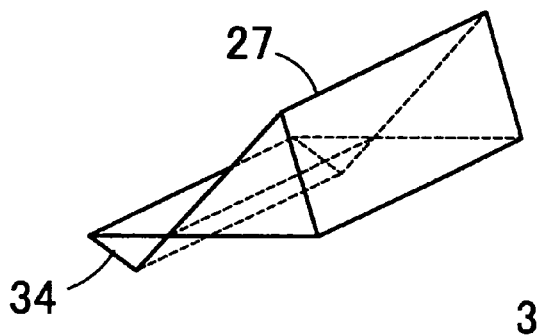
FIGS. 22A to 22C show a perspective view, a sectional view and a plan view of deflection patterns having a still different shape formed on the pattern surface of the surface light source device according to the third embodiment.
Figure 22D:
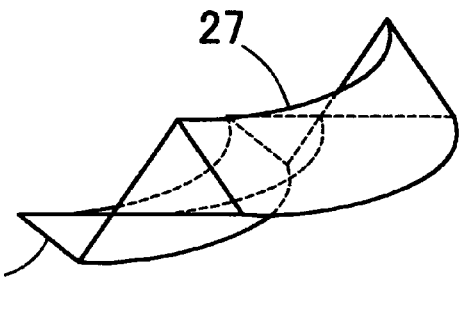
FIGS. 22D to 22F show a perspective view, a sectional view and a plan view of the deflection patterns having a still different shape.
Figure 22B:
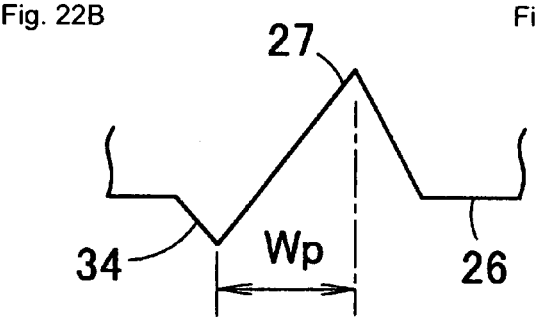
Figure 22E:
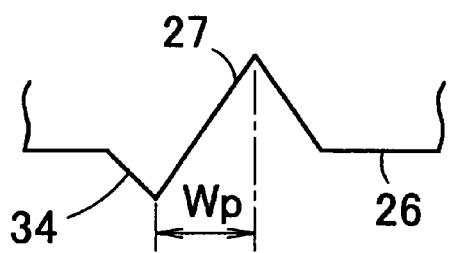
Figure 22C:
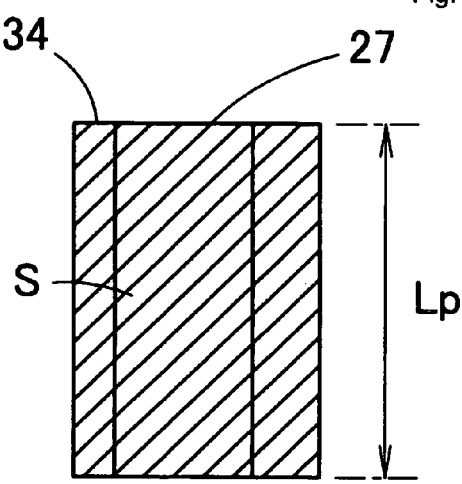
Figure 22F:
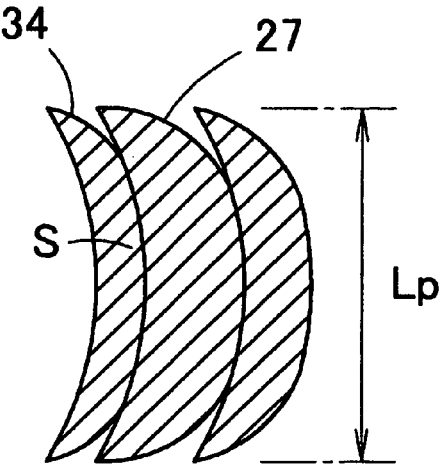

Since the entire constitution of the liquid crystal display in a third embodiment is similar to that in the first embodiment, like members are explained by using like reference numerals. FIG. 20 shows a perspective view illustrating the surface light source device 12 to be used in the liquid crystal display of the third embodiment, and a spot light source is used as the light source 23. In the surface light source device 12, when a distance from the light source 23 to a certain deflection pattern 27 is designated by Rp, a projection area of that deflection pattern 27 to the pattern surface 26 (average area) is designated by S and a thickness of the light guide plate in the position of that deflection pattern 27 is designated by d, an average value of S/(Rp×d) of all the deflection patterns 27 in each pixel in a certain sampling region 31 is designated by μα and the standard deviation is designated by σα. In at least some sampling regions 31, the following relationship is satisfied:

$$\sigma\alpha/\mu\alpha \leq 0.154 \qquad \text{Mathematical Formula (11)}$$

In general, in the surface light source device using the spot light source, in order to obtain the uniform emitted light quantity in any positions, (the pattern density/the thickness d of the light guide plate 22) is increased in the position comparatively closer to the light source linearly with respect to the distance from the light source and is increased regardless of the linear relationship in the position far from the light source (for example, see Japanese Patent No. 3151830). The deflection patterns 27 are discretely arranged on the concentric circle about the light source on the pattern surface 26 of the light guide plate 22 so that the pattern density of the deflection patterns 27 becomes comparatively small in the vicinity of the light source 23 and the pattern density becomes gradually larger in the positions farther from the light source 23. The pattern density of the deflection patterns 27 is proportional to a product Rp×d of the distance Rp from the light source 23 and the thickness d of the light guide plate 22 in the vicinity of the light source 23. The pattern density increases over the product Rp×d in the position comparatively farther from the light source 23. In Patent No. 31518330, since it is supposed that the surface light source device uniformly emits light, the light quantity per pattern unit area where the patterns emit light is proportional to the inverse number of the pattern density. For this reason, the luminance of each pixel in the liquid crystal display is proportional to a product of the projection area S of the pattern in the pixel and the inverse number of the pattern density. In at least the vicinity of the light source 23, therefore, the luminance of each pixel 29 is proportional to $S/(\text{pattern density}) = S/(Rp \times d)$ Therefore, $\sigma\alpha/\mu\alpha$ obtained in the sampling region 31 is equal with the luminance scattering $\sigma c/\mu c$ of each pixel in the liquid crystal display at least in the vicinity of the light source. When the value of $\sigma\alpha/\mu\alpha$ is set to 0.154 or less, as is clear from the first embodiment, the luminance scattering can be reduced and the glare on the screen cannot be observed. Since the pattern density of the deflection patterns 27 is large in the position separated from the light source 23, the mathematical formula (11) is automatically satisfied, and thus the glare on the screen is hardly generated.

FIGS. 21 and 22 show the deflection patterns 27 having various shapes formed on the pattern surface 26 of the surface light source device 12, the light source 23 is positioned on the left side in the diagrams. The deflection patterns 27 shown in FIGS. 21A, 21B and 21C are formed by denting the pattern surface 26 into a triangular prism shape. FIG. 21A shows a perspective view, FIG. 21B shows a sectional view and FIG. 21C shows a plan view. The deflection patterns 27 shown in FIGS. 21D to 21F are formed by denting the pattern surface 26 so that the section has a triangular prism shape and curving it along a lengthwise direction. FIG. 21D shows a perspective view, FIG. 21E shows a sectional view and FIG. 21F shows a plan view. The deflection patterns 27 shown in FIGS. 22A to 22C are formed by denting the pattern surface 26 into a triangular prism shape, and a triangular-prism-shaped projection 34 is formed adjacent to the light source side. FIG. 22A shows a perspective view of the deflection patterns 27 and the projection 34, FIG. 22B shows a sectional view and FIG. 22C shows a plan view. The deflection patterns 27 shown in FIGS. 22D to 22E are formed by denting the pattern surface 26 to create a triangular prism-shaped section, and curving it along the lengthwise direction, and the projection 34 having the triangular prism-shaped section is formed to be adjacent to the light source side and be curved. FIG. 22D shows a perspective view of the deflection pattern 27 and the projection 34, FIG. 22E shows a sectional view and FIG. 22F shows a plan view.

The width Wp of a tilt surface of each deflection pattern 27 on the light source side shown in FIGS. 21 and 22 is 0.7 to 2.75 μm, and the length Lp of the deflection pattern 27 is 1 to 21 Mm. The deflection patterns 27 of these shapes may be mixed, and the width Wp of the tilt surface of the deflection pattern 27 on the light source side and the length Lp of the deflection pattern 27 may scatter within the range of the above values. The deflection patterns 27 are arranged randomly so that the average pattern gap Samp_A is 0.28 or less time as large as the pixel pitch p. For example, in the case where the pixel pitch p is 160 μm, the average pattern gap satisfies a relationship Samp_A≦44.8 μm.

Figure 23B:
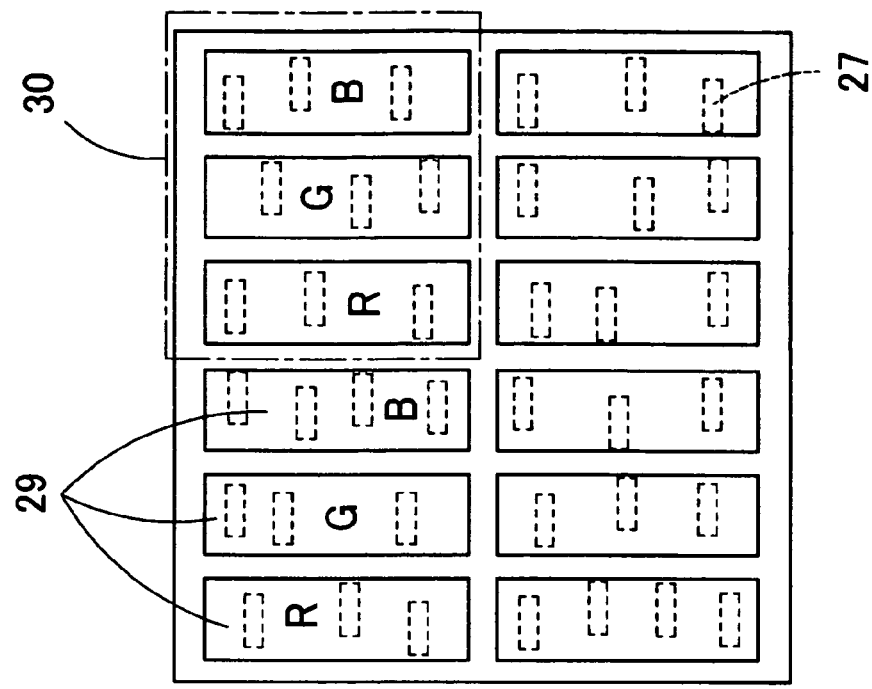
FIG. 23B shows a schematic diagram illustrating distribution of deflection patterns in a position separated from the light source.
Figure 23A:
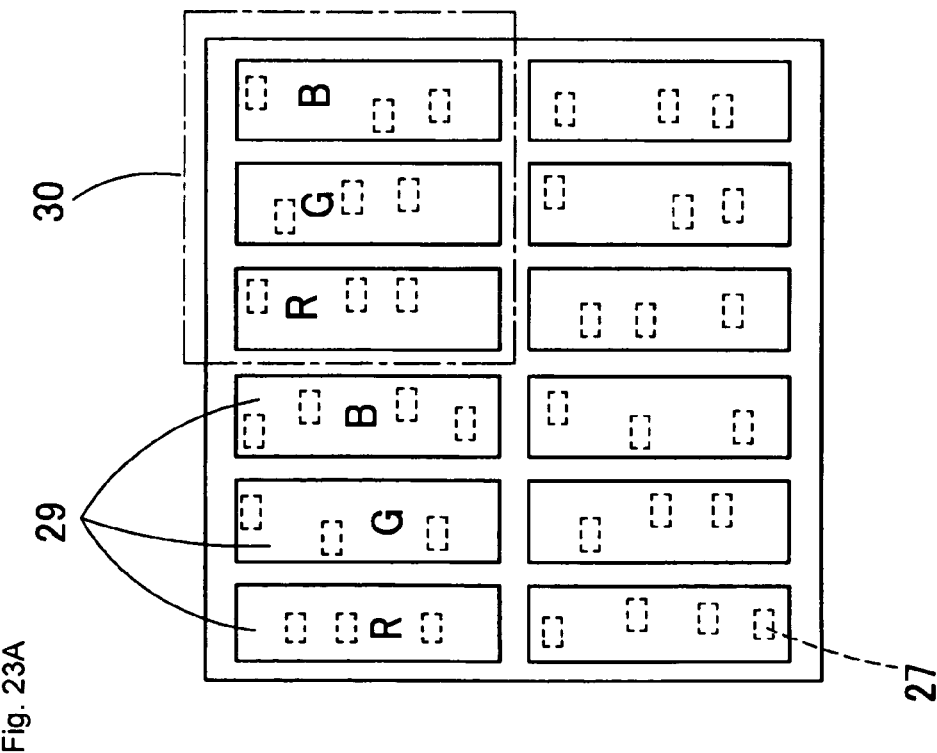
FIG. 23A shows a schematic diagram illustrating distribution of the deflection patterns near the light source.

In the third embodiment, the pattern density of the deflection patterns 27 is small in the vicinity of the light source 23, and the pattern density is larger in positions farther from the light source 23. Concretely, the deflection patterns 27 are arranged as shown in FIGS. 23A and 23B. FIG. 23A shows a diagram illustrating the arrangement of the deflection patterns 27 in the pixels 29 in the vicinity of the light source 23. FIG. 23B shows a diagram illustrating the arrangement of the deflection patterns 27 in the pixels 29 in positions slightly separated from the light source 23. In the vicinity of the light source 23, as shown in FIG. 23A, the number of the deflection patterns 27 in one pixel 29 is reduced, and the pattern area S of one deflection pattern 27 is also reduced. As being farther from the light source 23, as shown in FIG. 23B, for example, the number of the deflection patterns 27 in one pixel 29 is gradually increased, and the pattern area S of one deflection pattern 27 is gradually increased.

Figure 24:
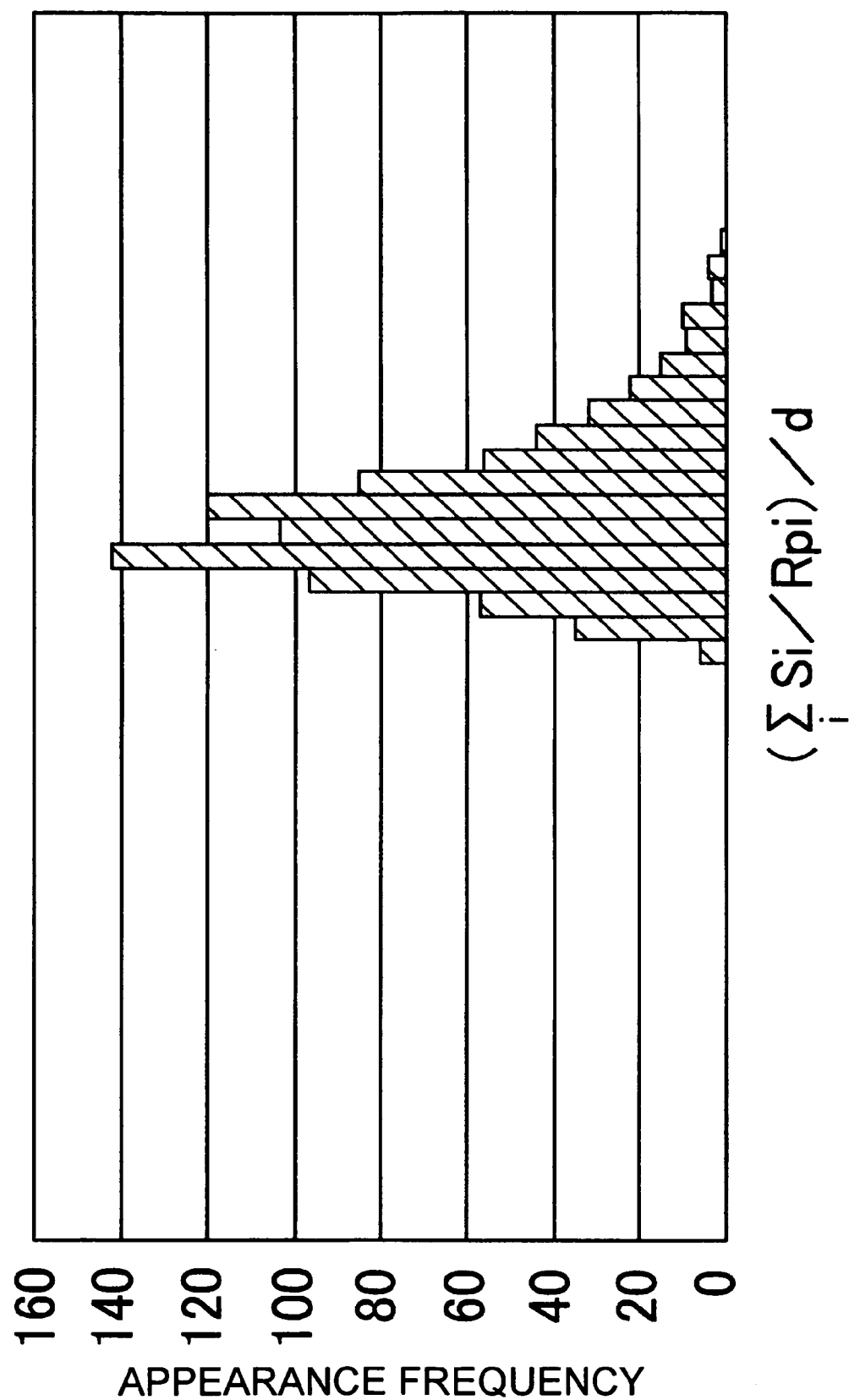
FIG. 24 shows a histogram illustrating distribution of (Projection area Si)/(distance Rpi from the light source×the thickness d of the light guide plate) of deflection patterns in the sampling region.

(The projection area Si)/(the distance Rpi from the light source×the thickness d of the light guide plate) of each deflection pattern 27 in the sampling region 31 is obtained, and its distribution is examined so that a histogram shown in FIG. 24 is obtained (i is the serial number of the deflection patterns 27). When $\sigma\alpha/\mu\alpha$ obtained from the histogram is larger than 0.154, the deflection patterns 27 are rearranged so that $\sigma\alpha/\mu\alpha$ becomes small. As a result, $\sigma\alpha/\mu\alpha$ becomes about 0.101.

Figure 25A:
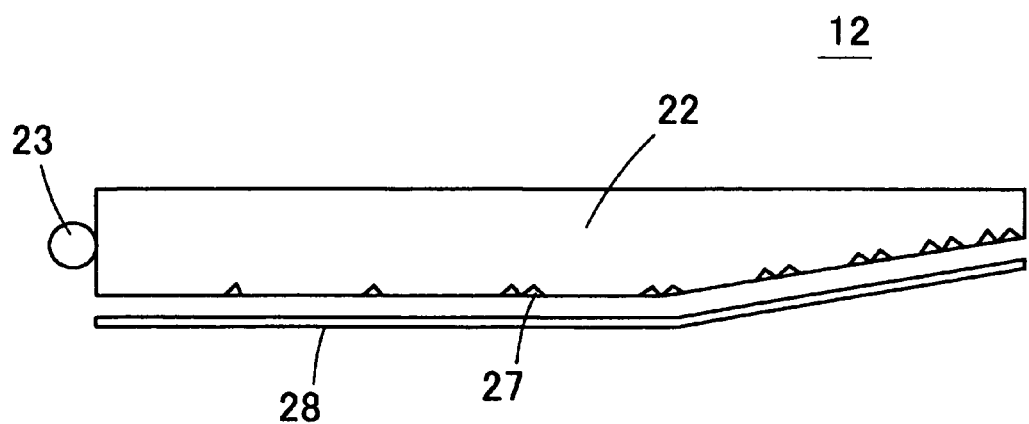
FIGS. 25A to 25C show sectional views illustrating a surface light source device according to the third embodiment.
Figure 25B:
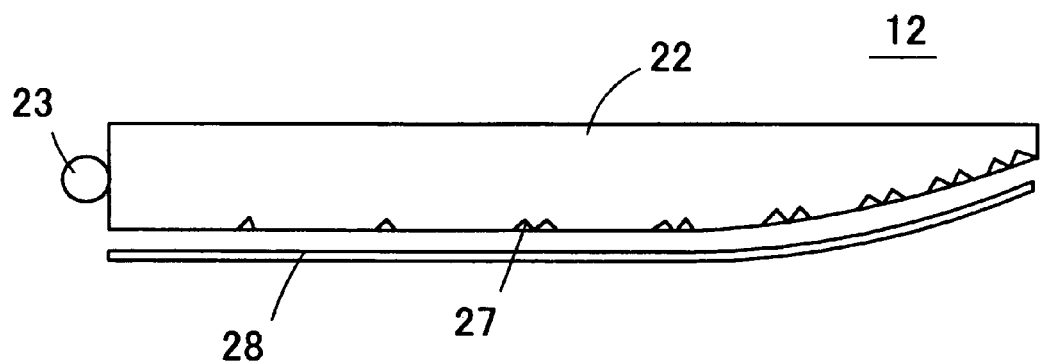
Figure 25C:
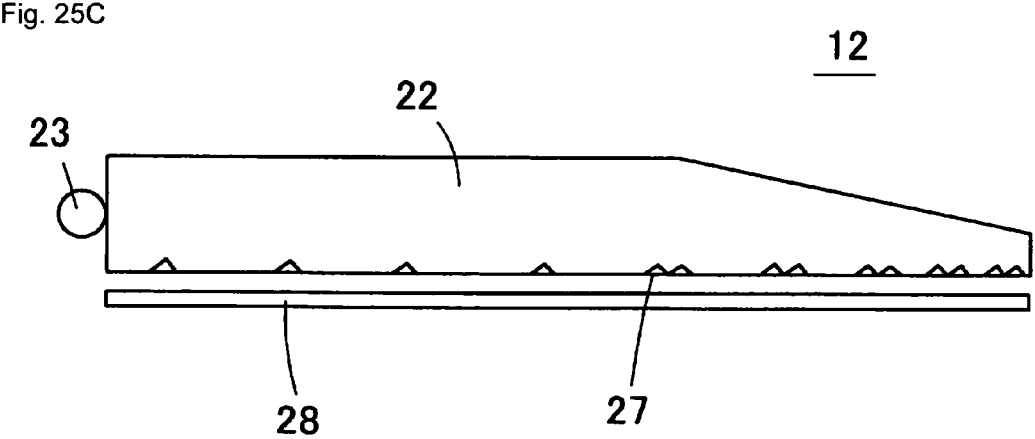

FIGS. 25A, 25B and 25C show modified examples of the third embodiment. These show the case where the thickness d of the light guide plate 22 is not constant. The diagrams show the light guide plates 22 having various sectional shapes, but in all the examples, the portion of the light guide plate 22 having the largest thickness d is 0.8 mm, and in portions separated farther from the light source 23, the thickness of the light guide plate 22 becomes thinner.

In this case, the sampling region 31 is a square region having one side of 5 mm for example, and Si/(Rpi×di) is obtained for each deflection pattern 27 in this region. The ratio of the standard deviation ca to the average μα becomes 0.154 or less. Si designates the projection area of each deflection pattern 27, Rpi designates the distance between the deflection pattern 27 and the light source 23, and di designates the thickness of the light guide plate 22 in the positions of the deflection patterns 27. In these modified examples, the distance Rpi becomes longer in position separated farther from the light source 23, but the thickness di of the light guide plate 22 is small. For this reason, the area Si of the deflection patterns 27 does not have to be changed unlike the third embodiment.

A fourth embodiment explains a both-surface display type liquid crystal display using the surface light source device 12. In a both surface display type liquid crystal display 41 shown in FIG. 26A, the liquid crystal panel 14 is arranged opposite the light-emitting plane of the light guide plate 22, and a semi-transmissive semi-reflecting film 42 is provided to the front surface of the liquid crystal panel 14. In the liquid crystal display 41, the light emitted from the light-emitting plane of the surface light source device 12 transmits through the liquid crystal panel 14, and the half of the light transmitted through the liquid crystal panel 14 transmits through the semi-transmissive semi-reflecting film 42. An image is recognized on the front surface side of the liquid crystal display 41. The residual half of the light reflected from the semi-transmissive semi-reflecting film 42 transmits through the liquid crystal panel 14 and the light guide plate 22, and an image is recognized on the rear face side of the liquid crystal display 41. The semi-transmissive semi-reflecting film 42 may be provided to an inner surface of the glass substrate on front surface side, and in this case, it may be a semi-transmissive semi-reflecting electrode.

Figures 26A, 26B:
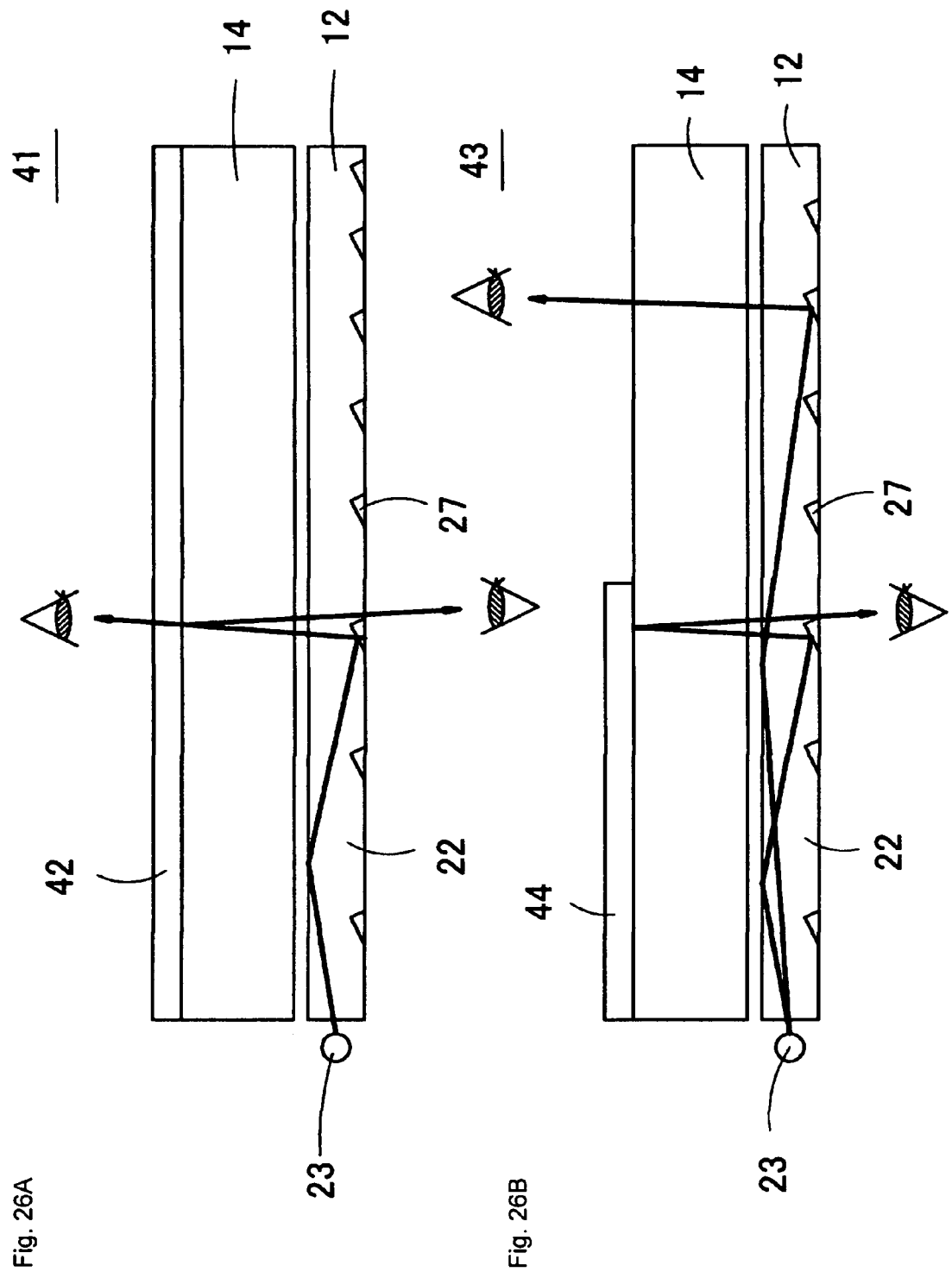
FIG. 26A shows a schematic sectional view illustrating a both-surface display type liquid crystal display according to one embodiment of the present invention.
FIG. 26B shows a schematic sectional view illustrating a different both-surface display type liquid crystal display device according to another embodiment.

In a divided both surface display type liquid crystal display 43 shown in FIG. 26B, the liquid crystal panel 14 is arranged opposite the light-emitting plane of the light guide plate 22, and a reflecting film 44 is provided to a region on one half side of the front face of the liquid crystal panel 14. In the liquid crystal display 43, the light, which is emitted from the light-emitting plane of the surface light source device 12 in the region which is not provided with the reflecting film 44, transmits through the liquid crystal panel 14, and an image is recognized on the front surface side of the liquid crystal display 41. The light, which is emitted from the light-emitting plane of the surface light source device 12 in the region which is provided with the reflecting film 44, transmits through the liquid crystal panel 14 and is reflected from the reflecting film 44. The light then transmits through the liquid crystal panel 14 and the light guide plate 22, and an image is recognized on the rear face of the liquid crystal display 41. The reflecting film 44 may be provided to the inner surface of the glass substrate on the front surface side or may be a reflecting electrode in this case.

According to the liquid crystal displays 41 and 43, the both surface display type liquid crystal display with less glare on the screen where Moire fringes are hardly generated can be obtained.

The liquid crystal display according to one or several embodiments of the present invention can be incorporated into various devices. For example, FIGS. 27A and 27B show a folding type cellular telephone 45 into which the liquid crystal display 46 is incorporated. In the cellular telephone 45, an operating section 48 having a ten-key keypad or the like and a display section 49 having the both surface type liquid crystal display 46 are rotatably connected and can be opened and closed. In the liquid crystal display 46 incorporated into the display section 49, one display surface 47a is exposed from the outer surface side of the display section 49, and the other display surface 47b is exposed from the inner surface side, and thus an image can be seen from both the sides.

Figure 28A:
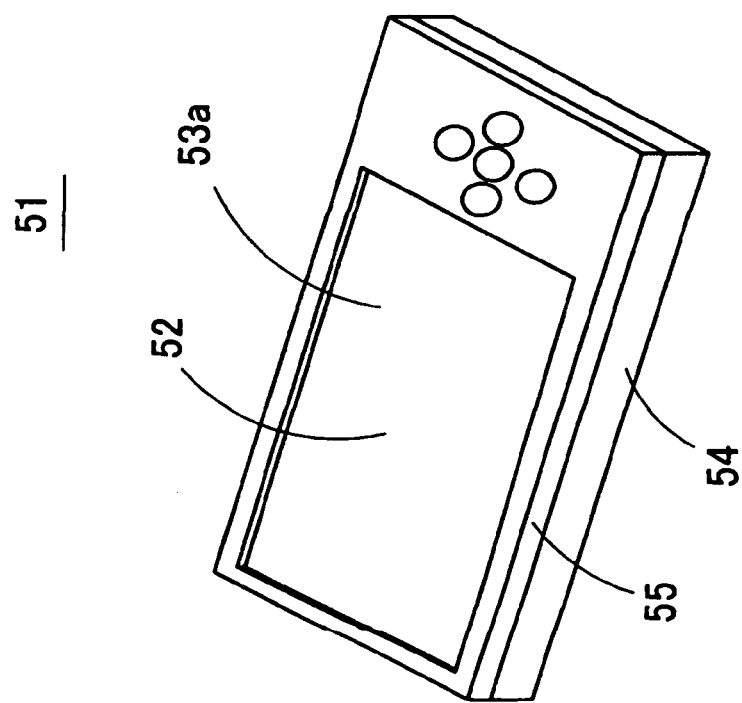
FIGS. 28A and 28B show perspective views illustrating a personal digital assistant into which a liquid crystal display according to another embodiment of the present invention is incorporated.
Figure 28B:
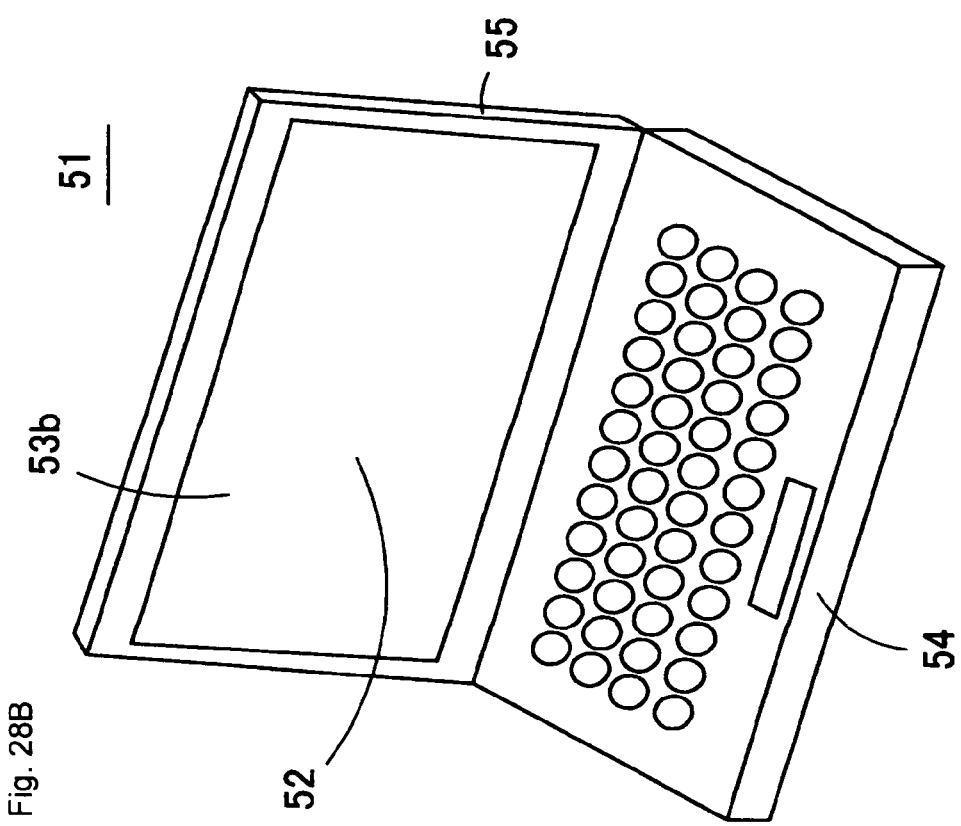

FIGS. 28A and 28B show a persona digital assistant 51 into which the liquid crystal display 52 according to an embodiment of the present invention is incorporated. In the personal digital assistant 51, an input section 54 having an input key or the like and a display section 55 having the both surface display type liquid crystal display 52 are rotatably connected and can be opened and closed. In the liquid crystal display 52 incorporated into the display section 55, one display surface 53a is exposed from an outside surface side of the display section 55, and the other display surface 53b is exposed from an inner surface side. An image can be seen from both the surfaces.

Not shown, but a one surface display type display may be incorporated as the liquid crystal display.

When the liquid crystal display according to an embodiment of the present invention is incorporated into portable devices such as cellular telephones and personal digital assistants, a user can see a satisfactory image without feeling glare on the screen. Since a diffusion sheet or a prism sheet for preventing glare does not have to be incorporated, the number of the parts for assembly and the steps thereof can be reduced, so that the cost can be reduced.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A liquid crystal display, comprising:
   a light guide plate having a light-emitting plane on one end surface;
   a light source arranged on a side surface of the light guide plate; and
   a liquid crystal panel arranged opposite the light-emitting plane;
   wherein deflection patterns are formed on a surface opposite the light-emitting plane,
   the defection patterns are arranged so that two independent components on the surface opposite the light-emitting plane become random,
   in a certain region on the surface opposite the light-emitting plane, when an average number of the deflection patterns included in each region opposite each pixel of the liquid crystal panel is designated by μn and a standard deviation is designated by μn, their ratio satisfies the following relationship:

$0 < \sigma n / \mu n \leq 0.154,$ light from the light source introduced into the light guide plate is deflected towards the light-emitting plane by the deflection patterns so as to be emitted from the light-emitting plane,
   the liquid crystal panel is illuminated by the light emitted from the light-emitting plane.

2. The liquid crystal display according to claim 1, wherein a minimum gap between the deflection patterns is larger in a direction parallel with a direction of the light source than that in a direction perpendicular to the direction of the light source.

3. A liquid crystal display, comprising:
   a light guide plate having a light-emitting plane on one end surface;
   a light source arranged on a side surface of the light guide plate; and
   a liquid crystal panel arranged opposite the light-emitting plane,
   wherein deflection patterns are formed on a surface opposite the light-emitting plane,
   the deflection patterns are arranged so that two independent components on the surface opposite the light-emitting plane are random,
   in a certain square region having a side with length of K on the surface opposite the light-emitting plane, when the number of the deflection patterns included in the corresponding square region is designated by M, a ratio of a pixel pitch p of the liquid crystal panel to an average pattern gap defined by:

$Samp\_A = K/(\sqrt{M})$ satisfies the following relationship:

$Samp\_A/p \leq 0.28,$ light from the light source introduced into the light guide plate is deflected towards the light-emitting plane by the deflection patterns so as to be emitted from the light-emitting plane, the liquid crystal panel is illuminated by the light emitted from the light-emitting plane.

4. The liquid crystal display according to claim 3, wherein a minimum gap between the deflection patterns is larger in a direction parallel with a direction of the light source than that in a direction perpendicular to the direction of the light source.

5. A liquid crystal display, comprising:

a light guide plate having a light-emitting plane on one end surface;

a point light source arranged on a side surface of the light guide plate; and a liquid crystal panel arranged opposite the light-emitting plane, wherein deflection patterns are formed on a surface opposite the light-emitting plane, the deflection patterns are arranged so that two independent components on the surface opposite the light-emitting plane are random, in the case where a projection area of the deflection patterns to the light-emitting plane is designated by S, a distance between the light source and the deflection pattern is designated by Rp and a thickness of the light guide plate in positions of the deflection patterns is designate by d, in a certain region on the surface opposite the light-emitting plane, when an average value obtained by adding S/(Rp×d) of all the deflection patterns included in all the regions opposite the pixels of the liquid crystal panel is designated by $\mu\alpha$ and a standard deviation is designated by $\sigma\alpha$, their ratio satisfies the following relationship:

$0<\sigma\alpha/\mu\alpha\leq0.154$, light from the light source introduced into the light guide plate is deflected towards the light-emitting plane by the deflection patterns so as to be emitted from the light-emitting plane, the liquid crystal panel is illuminated by the light emitted from the light-emitting plane.

6. The liquid crystal display according to claim 5, wherein a minimum gap between the deflection patterns is larger in a direction parallel with a direction of the light source than that in a direction perpendicular to the direction of the light source.

7. A surface light source device, comprising:

a light guide plate having a light-emitting plane on one end surface; and a light source arranged on a side surface of the light guide plate;

wherein deflection patterns are formed on a surface opposite the light-emitting plane, the defection patterns are arranged so that two independent components on the surface opposite the light-emitting plane become random, in a certain region on the surface opposite the light-emitting plane, when an average number of the deflection patterns included in each pixel corresponding region is designated by $\mu n$ and a standard deviation is designated by $\sigma n$, their ratio satisfies the following relationship:

$0<\sigma n/\mu n\leq0.154$, light from the light source introduced into the light guide plate is deflected towards the light-emitting plane by the deflection patterns so as to be emitted from the light-emitting plane.

8. A surface light source device, comprising:

a light guide plate having a light-emitting plane on one end surface; and a light source arranged on a side surface of the light guide plate;

wherein deflection patterns are formed on a surface opposite the light-emitting plane, the deflection patterns are arranged so that two independent components on the surface opposite the light-emitting plane are random, in a certain square region having a side with length of K on the surface opposite the light-emitting plane, when the number of the deflection patterns included in the corresponding square region is designated by M, a ratio of a pixel pitch p of a pixel corresponding region to an average pattern gap defined by:

$Samp\_A=K/(\sqrt{M})$ satisfies the following relationship:

$Samp\_A/p\leq0.28$, light from the light source introduced into the light guide plate is deflected towards the light-emitting plane by the deflection patterns so as to be emitted from the light-emitting plane.

9. A surface light source device, comprising:

a light guide plate having a light-emitting plane on one end surface; and a point light source arranged on a side surface of the light guide plate;

wherein deflection patterns are formed on a surface opposite the light-emitting plane, the deflection patterns are arranged so that two independent components on the surface opposite the light-emitting plane are random, in the case where a projection area of the deflection patterns to the light-emitting plane is designated by S, a distance between the light source and the deflection pattern is designated by Rp and a thickness of the light guide plate in positions of the deflection patterns is designate by d, in a certain region on the surface opposite the light-emitting plane, when an average value obtained by adding S/(Rp×d) of all the deflection patterns included in all the pixel corresponding regions of the liquid crystal panel is designated by $\mu\alpha$ and a standard deviation is designated by $\sigma\alpha$, their ratio satisfies the following relationship:

$0<\sigma\alpha/\mu\alpha\leq0.154$, light from the light source introduced into the light guide plate is deflected towards the light-emitting plane by the deflection patterns so as to be emitted from the light-emitting plane.

* * * * *

UNITED STATES PATENT AND TRADEMARK OFFICE
CERTIFICATE OF CORRECTION

PATENT NO. : 7,471,355 B2  Page 1 of 1
APPLICATION NO. : 11/502747
DATED : December 30, 2008
INVENTOR(S) : Ken Watanuki et al.

It is certified that error appears in the above-identified patent and that said Letters Patent is hereby corrected as shown below:

In claim 1, column 20, line 29, "μn" should be --σn--.

Signed and Sealed this

Twenty-fourth Day of February, 2009

JOHN DOLL
*Acting Director of the United States Patent and Trademark Office*